(12) United States Patent
Geens et al.

(10) Patent No.: US 10,866,378 B2
(45) Date of Patent: Dec. 15, 2020

(54) TELECOMMUNICATIONS SYSTEM AND METHODS

(71) Applicant: COMMSCOPE CONNECTIVITY BELGIUM BVBA, Kessel-Lo (BE)

(72) Inventors: Johan Geens, Bunsbeek (BE); Pieter Vermeulen, Westerlo (BE); Rudi Verbruggen, Holsbeek (BE); Eric Marcel M. Keustermans, Houwaart (BE)

(73) Assignee: CommScope Connectivity Belgium BVBA

( * ) Notice: Subject to any disclaimer, the term of this patent is extended or adjusted under 35 U.S.C. 154(b) by 0 days.

(21) Appl. No.: 16/339,986

(22) PCT Filed: Oct. 3, 2017

(86) PCT No.: PCT/EP2017/075090
§ 371 (c)(1),
(2) Date: Apr. 5, 2019

(87) PCT Pub. No.: WO2018/065423
PCT Pub. Date: Apr. 12, 2018

(65) Prior Publication Data
US 2020/0041743 A1    Feb. 6, 2020

Related U.S. Application Data

(60) Provisional application No. 62/404,523, filed on Oct. 5, 2016, provisional application No. 62/432,103, filed on Dec. 9, 2016.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/4455* (2013.01)

(58) Field of Classification Search
CPC .................. G02B 6/4439; G02B 6/444; G02B 6/4452–4455; G02B 6/4457; G02B 6/3897
(Continued)

(56) References Cited

U.S. PATENT DOCUMENTS 6,061,492 A * 5/2000 Strause ................ G02B 6/4452
385/134
6,304,707 B1 10/2001 Daems et al.
(Continued)

OTHER PUBLICATIONS

International Search Report and Written Opinion of the International Searching Authority for International Patent Application No. PCT/EP2017/075090 dated Feb. 6, 2018, 13 pages.

*Primary Examiner* — Robert Tavlykaev
(74) *Attorney, Agent, or Firm* — Merchant & Gould P.C.

(57) ABSTRACT

A cabinet having a framework for mounting telecommunications equipment includes a framework and telecommunications equipment mounted to the framework. The equipment may include splitter modules. Spools are mounted within the cabinet to manage overlength slack in fiber optic cables within the cabinet. A patch panel is mounted within the cabinet and define a plurality of cable termination locations for receiving at least some of the fiber optic cables. The patch panel is mounted on a pivotable frame between a storage position and an access position. The plurality of spools are positioned intermediate the telecommunications equipment and the patch panel. A splice area is mounted within the cabinet and is accessible when the pivotable frame is in the access position. The splice area receives fiber optic cables from the patch panel for splicing to additional cables.

19 Claims, 31 Drawing Sheets

(58) Field of Classification Search
USPC .......................... 385/134, 135; 361/610, 724
See application file for complete search history.

(56) References Cited

U.S. PATENT DOCUMENTS

| | | | | |
|---|---|---|---|---|
| 7,218,827 | B2 | 5/2007 | Vongseng et al. | |
| 7,522,805 | B2* | 4/2009 | Smith | G02B 6/4452 |
| | | | | 385/135 |
| 10,429,602 | B2* | 10/2019 | Smith | G02B 6/4285 |
| 2004/0228598 | A1* | 11/2004 | Allen | G02B 6/4454 |
| | | | | 385/135 |
| 2005/0129379 | A1* | 6/2005 | Reagan | H04Q 1/14 |
| | | | | 385/135 |
| 2006/0008231 | A1* | 1/2006 | Reagan | G02B 6/4471 |
| | | | | 385/135 |
| 2007/0189691 | A1* | 8/2007 | Barth | G02B 6/4452 |
| | | | | 385/135 |
| 2008/0031585 | A1 | 2/2008 | Solheid et al. | |
| 2010/0183276 | A1 | 7/2010 | Smith | |
| 2012/0152463 | A1* | 6/2012 | Sjodin | G02B 6/4454 |
| | | | | 156/502 |

* cited by examiner

TELECOMMUNICATIONS SYSTEM AND METHODS

CROSS-REFERENCE TO RELATED APPLICATIONS

This application is a National Stage Application of PCT/EP2017/075090, filed on Oct. 3, 2017, which claims the benefit of U.S. Patent Application Ser. No. 62/404,523, filed on Oct. 5, 2016, and claims the benefit of U.S. Patent Application Ser. No. 62/432,103, filed on Dec. 9, 2016, the disclosures of which are incorporated herein by reference in their entireties. To the extent appropriate, a claim of priority is made to each of the above disclosed applications.

TECHNICAL FIELD

This disclosure concerns optical fibers and organization of optical fibers. More specifically, this disclosure concerns an arrangement to bring splicing and overlength storage into a minimum footprint between equipment, including splitter modules, and incoming fiber optic cables.

BACKGROUND

There are systems that take in subscriber or distribution cables, splice them to a pigtail cable, and then connect the cable to equipment. These systems can occupy much space. Improvements in reducing the space occupied to a minimum footprint, without losing functionality, are desirable.

SUMMARY

To address the problems of prior systems, a telecommunications system is provided. The system includes a cabinet having a framework for mounting telecommunications equipment. Telecommunications equipment is mounted to the framework. A plurality of spools are mounted within the cabinet to manage overlength slack in fiber optic cables within the cabinet. A patch panel is mounted within the cabinet and define a plurality of cable termination locations for receiving at least some of the fiber optic cables. The patch panel is mounted on a pivotable frame between a storage position and an access position. The plurality of spools are positioned intermediate the telecommunications equipment and the patch panel. A splice area is mounted within the cabinet and is accessible when the pivotable frame is in the access position. The splice area receives fiber optic cables from the patch panel for splicing to additional cables.

The splice area can be mounted on the pivotable frame on an opposite side from the patch panel, in some embodiments.

In some embodiments, the splice area is mounted on a wall covered by the pivotable frame when the pivotable frame is in the storage position.

In one or more embodiments, there is also a parking area adjacent to the patch panel for holding at least some fiber optic cables that are not connected into the patch panel termination locations.

In some implementations, the pivotable frame includes a pivot section and a holding section. The pivot section is hingedly connected to the framework. The holding section holds the splice area. The holding section is angled at a non-zero angle relative to the pivot section.

In example embodiments, the holding section is angled at about 80-100 degrees relative to the pivot section.

In example embodiments, the holding section has first and second opposite sides. The first side holds the patch panel, and the second side holds the splice area. The plurality of cable radius limiters are positioned along an edge of the holding section between the first side and the second side.

In example embodiments, the cable radius limiters are arranged in a column along the edge of the holding section.

In one or more embodiments, the telecommunications equipment is arranged in a vertical column.

In example implementations, the spools are arranged in a vertical column adjacent to the column of telecommunications equipment.

In many examples, the pivotable frame is adjacent the column of spools, with the column of spools being between the column of telecommunications equipment and the pivotable frame.

In example implementations, the telecommunications equipment includes at least one splitter module.

In some examples, the telecommunications equipment comprises a plurality of splitter modules.

In example embodiments, the plurality of splitter modules includes at least two groups of splitter modules, and each group having more than one splitter module. The at least two groups are arranged vertically relative to each other and with a base portion of each group being angled toward the plurality of spools relative to an upper portion of each group.

In example embodiments, the at least two groups of splitter modules includes at least four groups of splitter modules.

In one or more embodiments, each group has at least four splitter modules.

In another aspect, a method of organizing fiber optic cable is provided. The method includes providing a cabinet including a framework for mounting telecommunications equipment; mounting telecommunications equipment to the framework; routing overlength slack in the fiber optic cables to a plurality of spools mounted within the cabinet; connecting at least some of the fiber optic cables into a patch panel mounted within the cabinet, wherein the patch panel is mounted on a pivotable frame between a storage position and an access position, and wherein the plurality of spools are positioned intermediate to the telecommunications equipment and the patch panel; pivoting the pivotable frame to the access position; and routing fiber optic cables from the patch panel to a splice area mounted within the cabinet and accessible when the pivotable frame is in the access position.

In example methods, the step of routing fiber optic cables to the splice area includes routing the fiber optic cables to the splice area mounted on the pivotable frame on an opposite side from the patch panel.

In example methods, the step of routing fiber optic cables to the splice area includes routing the fiber optic cables to the splice area mounted on a wall covered by the pivotable frame, when the pivotable frame is in the storage position.

In example methods, the step of mounting telecommunications equipment to the framework includes mounting at least one splitter module to the framework.

In example methods, the step of mounting at least one splitter module to the framework includes mounting a plurality of splitter modules to the framework.

In example methods, there can be a step of routing a fiber to a splice tray in the splice area to provide a splice fiber; routing the spliced fiber from the splice tray to one of the splitter modules to provide a plurality of pigtails; routing overlength slack in the pigtails to the spools; and connecting at least some of the pigtails to the patch panel.

In example methods, after the step of routing overlength slack in the pigtails to the spools, there can be a step of connecting at least some of the pigtails to a parking area adjacent to the patch panel.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated herein and constitute a part of the description, illustrate several aspects of the present disclosure. A brief description of the drawings is as follows.

DETAILED DESCRIPTION

To improve the prior art, a telecommunications system is provided that provides a compact way of bringing splicing and overlength storage into a minimum footprint between equipment and incoming cable.

Figure 1:
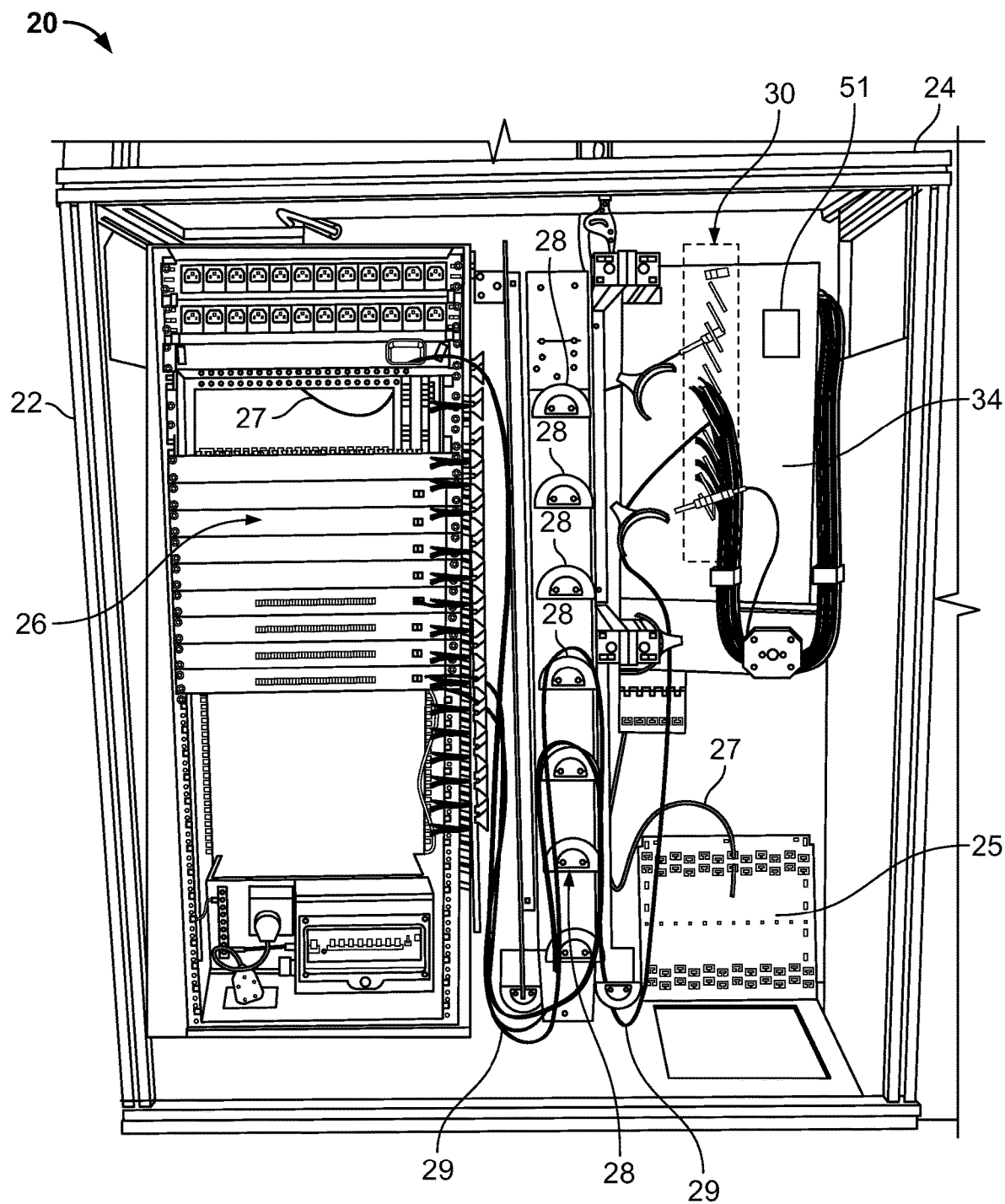
FIG. 1 is a perspective view of a first embodiment of a telecommunications system utilizing a patch panel mounted on a pivotable frame, the pivotable frame being shown in a storage position, constructed in accordance with principles of this disclosure.
Figure 3:
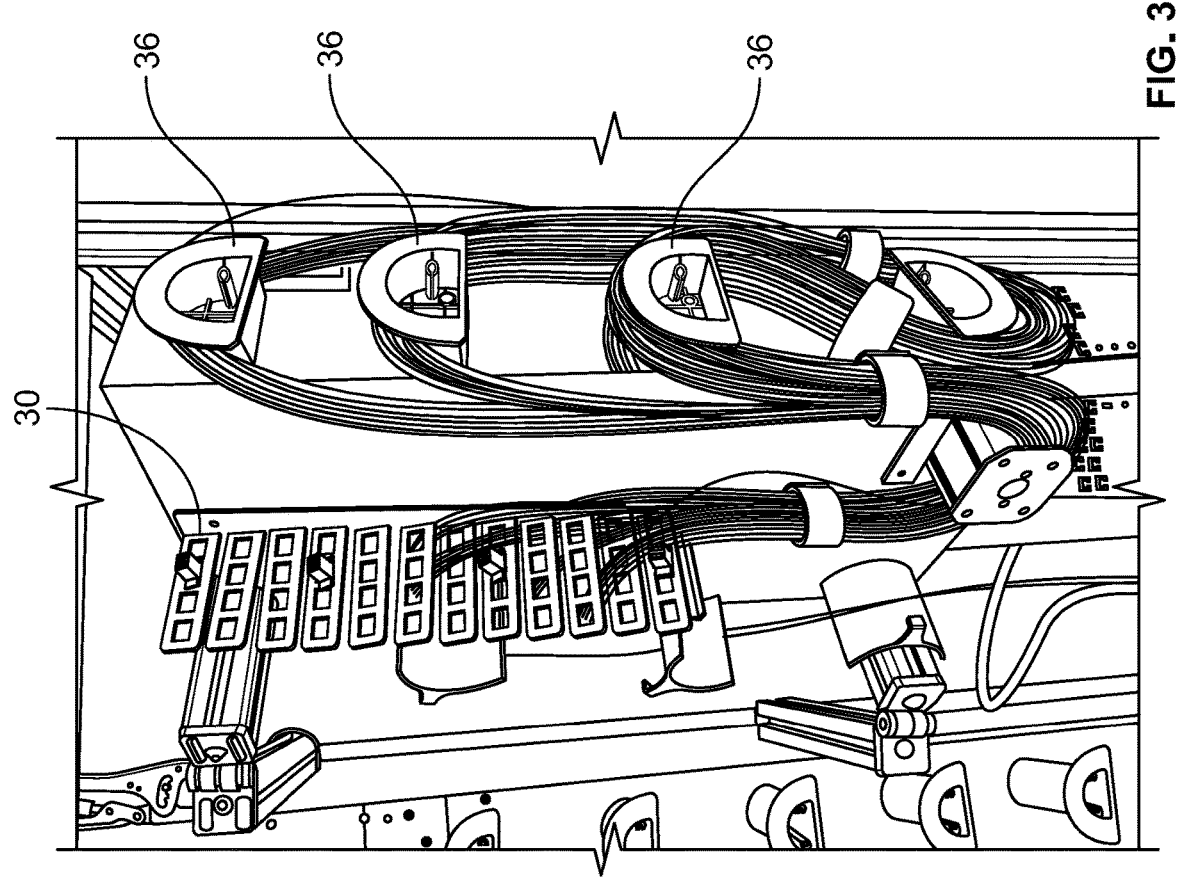
FIG. 3 is a perspective view of the pivotable frame and patch panel of FIG. 2 as it is beginning to be pivoted from the storage position to an access position.

FIG. 1 illustrates a first embodiment of a telecommunications system at 20. The system includes a cabinet 22. The cabinet 22 includes a rack or framework 24 for holding or mounting telecommunications equipment. Many embodiments are possible. In the example illustrated, the framework 24 is generally rectangular defining an interior holding the interior components, to be described further below.

The system 20 includes telecommunications equipment 26. The equipment 26 can be many different types of equipment that is used in fiber optic systems. For example, the equipment 26 can include active or passive equipment, including, e.g., an amplifier, etc.

In the example of FIG. 1, the telecommunications equipment 26 is arranged in a vertical column. In general, fiber optic cable 27 will be routed from the central office to the system 20 and into the cabinet 22 via plate 25 and then be connected to the equipment 26.

The system 20 further includes a plurality of slack storage members or spools 28. The spools 28 are mounted within the cabinet 22 to manage overlength slack in the fiber optic cables within the cabinet 22. The spools 28 organize and take up overlength or slack in cables 29 from the equipment 26. The spools 28 may be the type that are described in U.S. Pat. No. 6,289,159, incorporated herein by reference.

In the example shown in FIG. 1, the spools 28 are arranged in a vertical column adjacent to the column of telecommunications equipment 26.

In accordance with principles of this disclosure, the system 20 includes a patch panel 30 mounted within the cabinet 22. The patch panel 30 is provided as is well known in the art and defines a plurality of cable termination locations 32 for receiving at least some of the fiber optic cables 29 in the system 20, as the cables 29 are connected between the equipment 26 and the patch panel 30.

Figure 2:
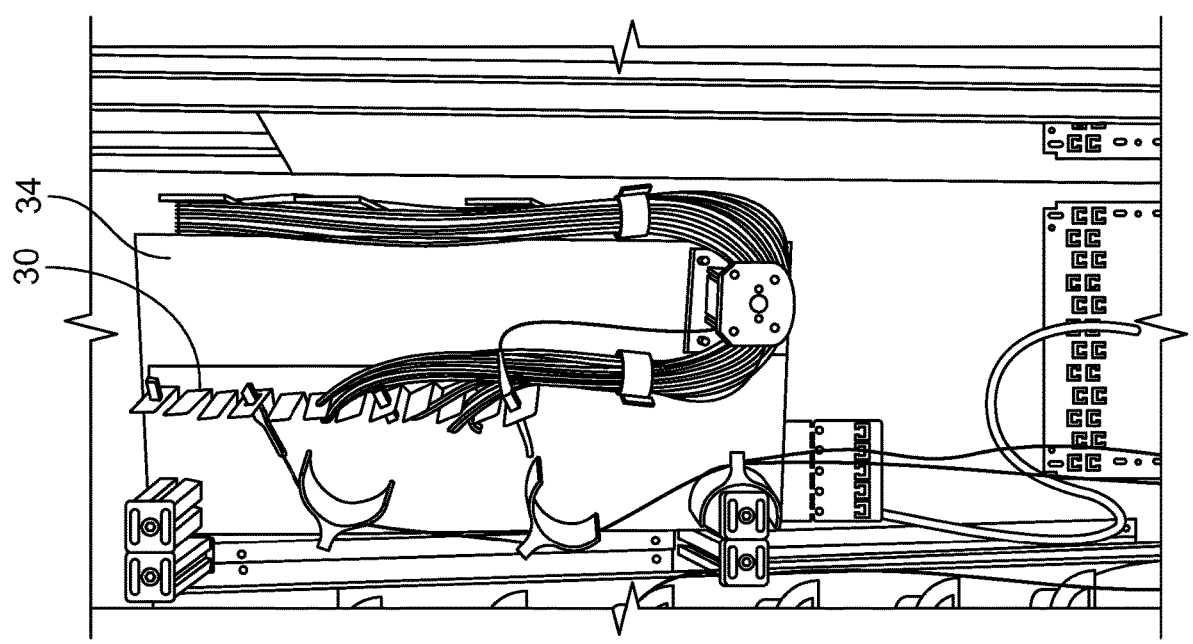
FIG. 2 is a perspective view of the pivotable frame and patch panel of FIG. 1.
Figure 5:
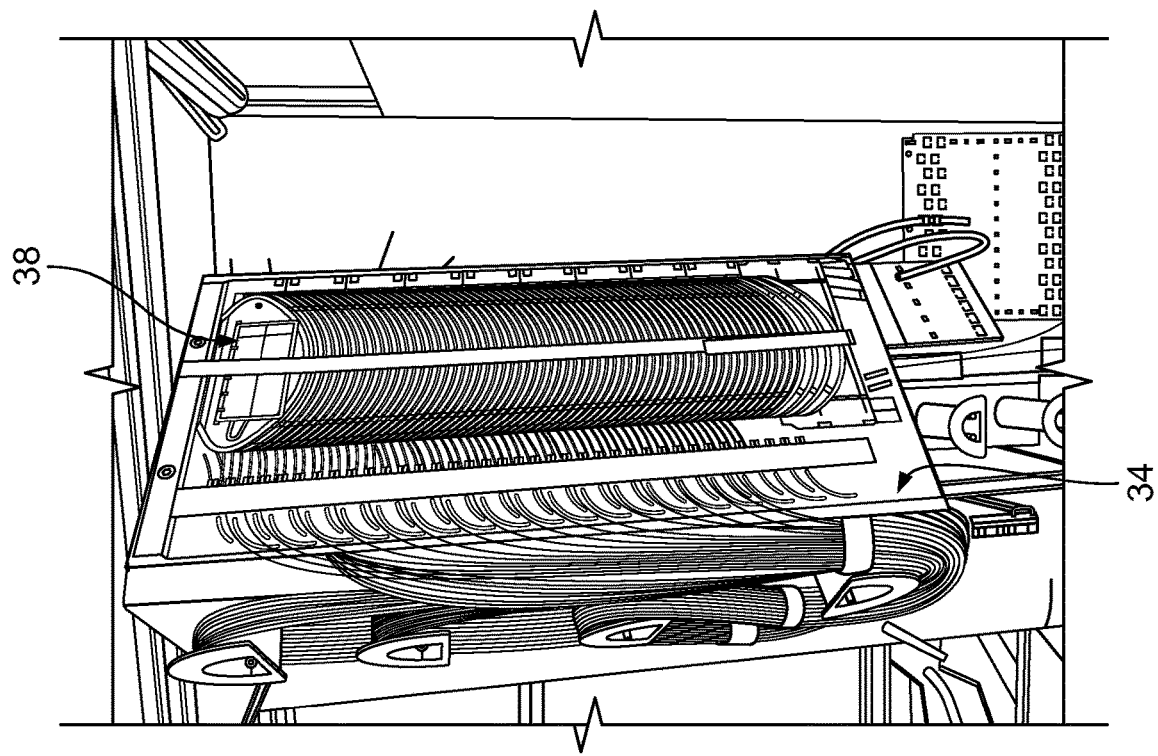
FIG. 5 is a perspective view of the pivotable frame of FIGS. 2-4 and showing the access position, in which the splice area is visible and can be accessed.
Figure 4:
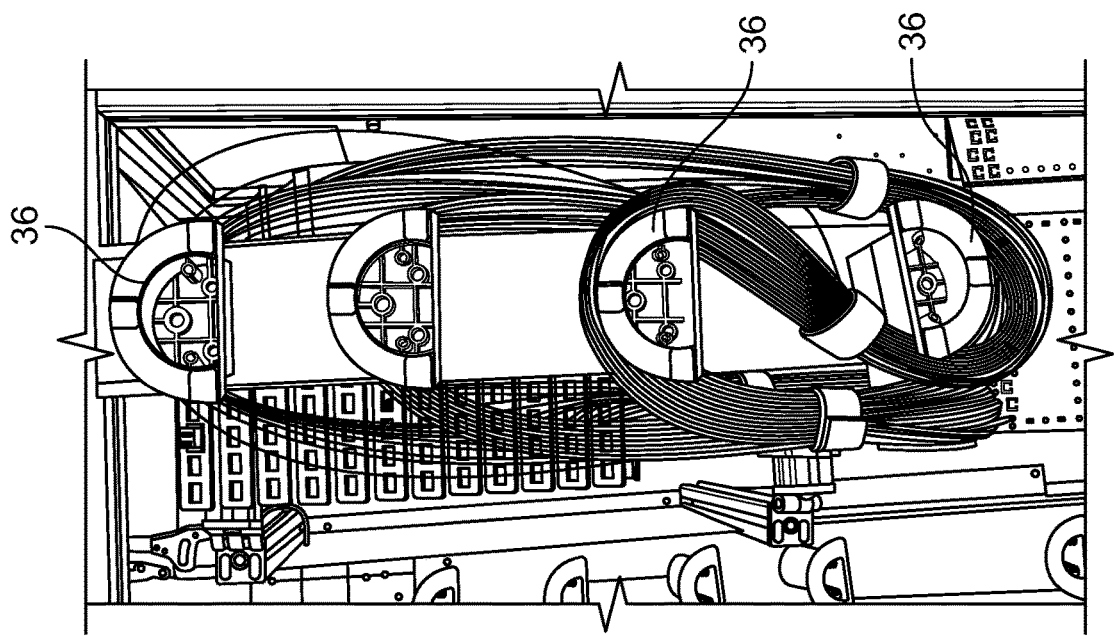
FIG. 4 is a perspective view of the patch panel and pivotable frame of FIG. 3 in a further position as it is being pivoted from the storage position to the access position.
Figure 6:
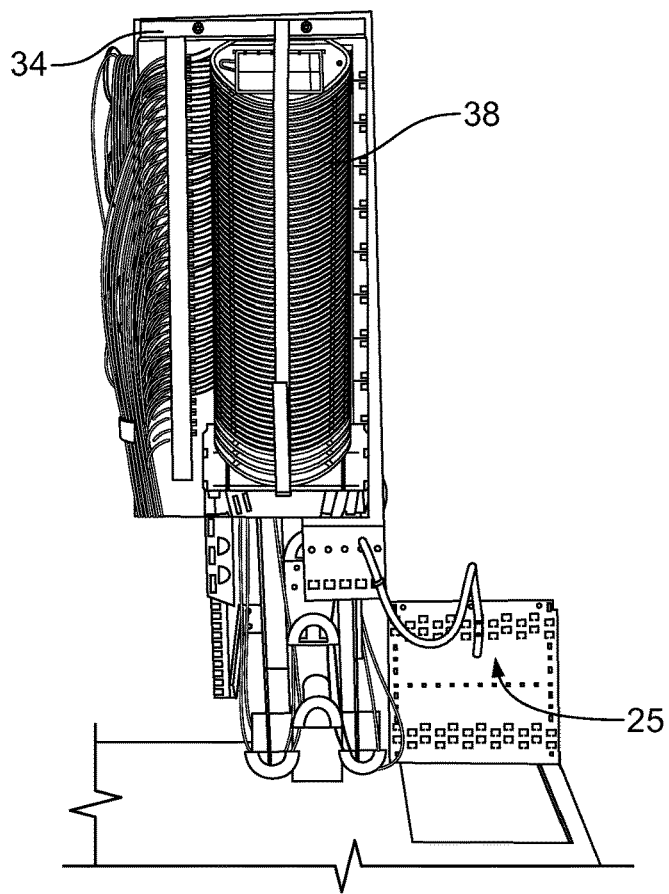
FIG. 6 is a perspective view of the pivotable frame of FIGS. 2-5 and in the access position, in which the splice area is visible and accessible.
Figure 7:
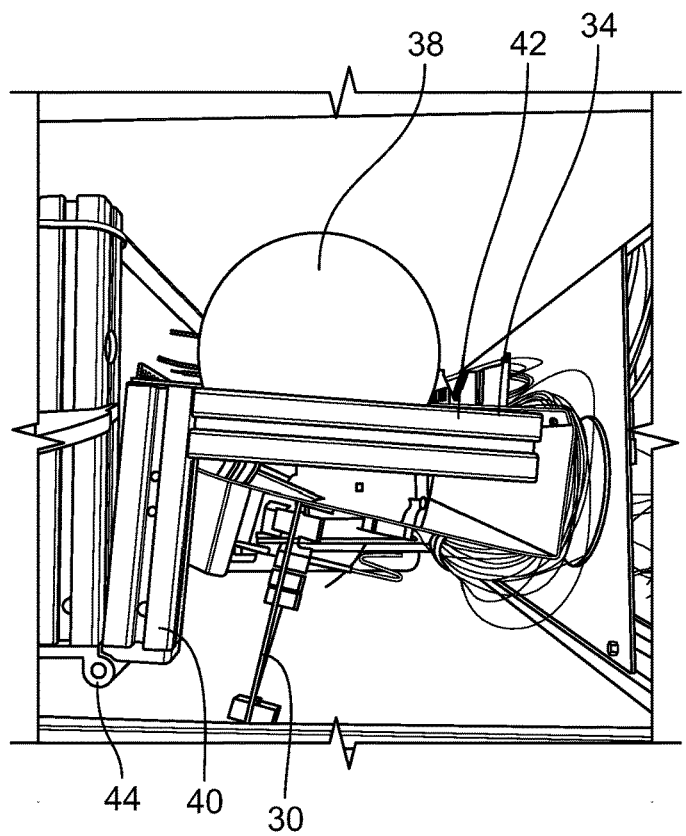
FIGS. 7-11 are top views of the pivotable frame of FIGS. 2-6 and showing various positions of the pivotable frame as it is rotated from the storage position (FIGS. 2 and 7) to the access position (FIGS. 6 and 11)
Figure 8:
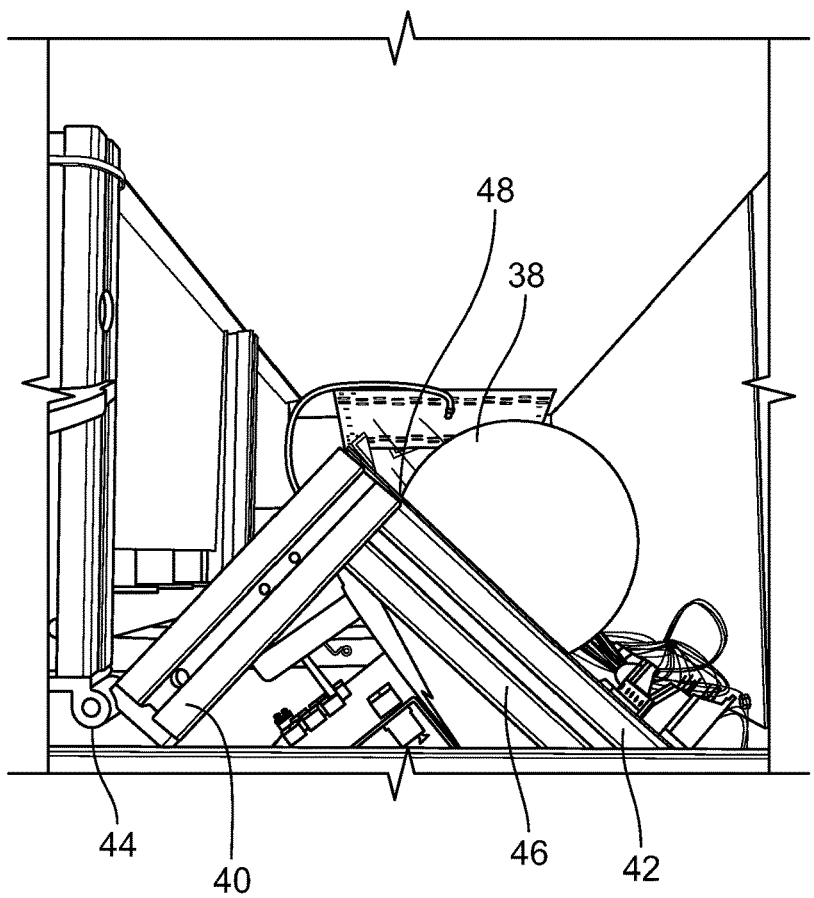
Figure 9:
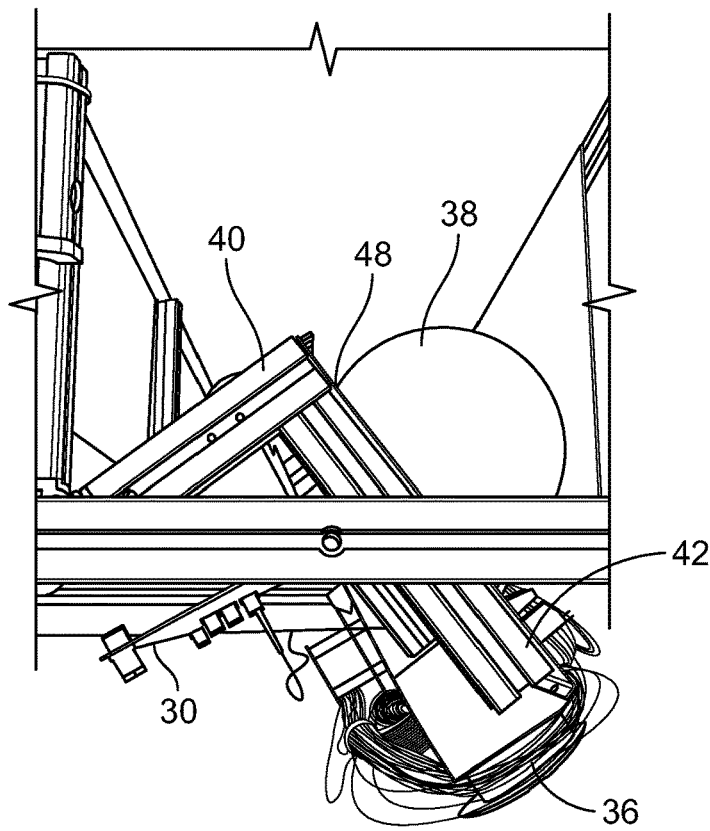
Figure 10:
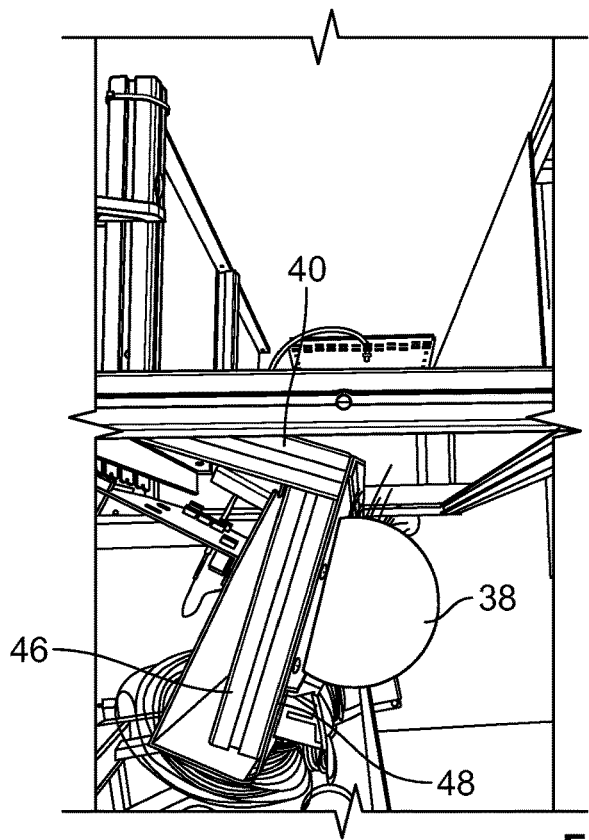
Figure 11:
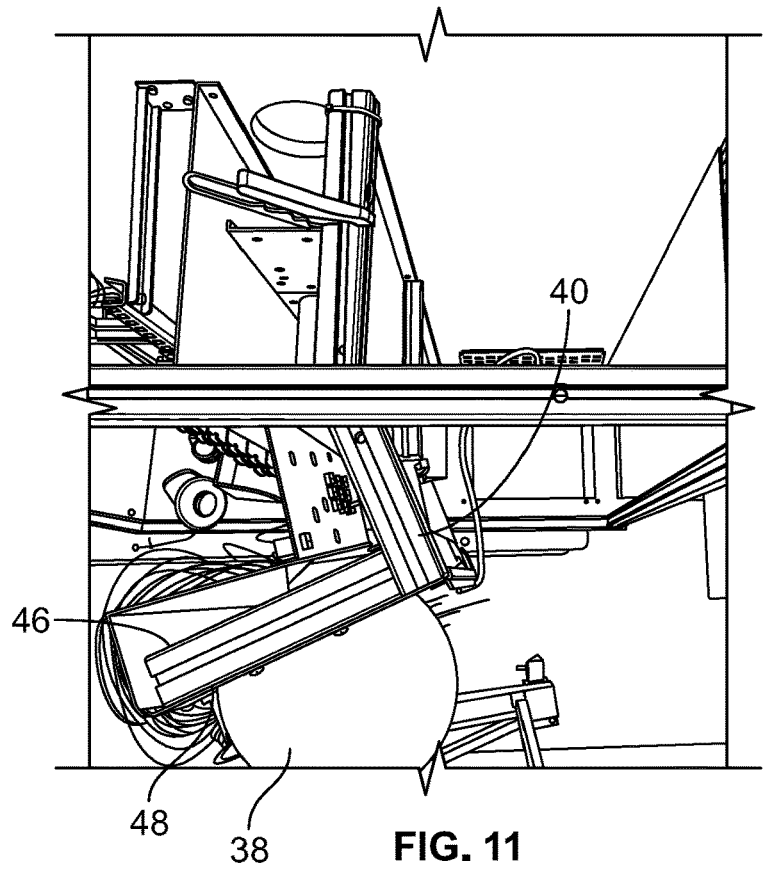

The patch panel 30 is mountable on a pivotable frame 34. The pivotable frame 34 is movable between a storage position (FIGS. 1 and 2) and an access position (FIGS. 6 and 11). As can be seen in FIG. 1, the plurality of spools 28 is positioned intermediate the telecommunications equipment 26 and the patch panel 30. As can also be realized from a review of FIG. 1, the pivotable frame 34 is adjacent the column of spools 28, and the column of spools 28 is between the column of telecommunications equipment 26 and the pivotable frame 34.

A plurality of cable radius limiters 36 can be mounted on the pivotable frame 34 to help manage the cable and protect the fibers in the cable. The radius limiters 36 are positioned between the patch panel 30 and a splice area 38.

The system 20 further includes splice area 38. The splice area 38 is mounted within the cabinet 22 and is accessible when the pivotable frame 34 is in the access position (FIGS. 6 and 11). The splice area 34 receives fiber optic cables from the patch panel 30 and is for splicing to additional cables. In many systems, the cables then exit the cabinet 22 and are directed to customers. The splice area 38 can be many different embodiments including splice trays, such as those described in U.S. Pat. No. 6,304,707, incorporated herein by reference. The cables may enter the splice area via troughs. Optionally, the cables may include a cable clamping device, and there may be a termination unit associated with the tray.

In the embodiment of FIGS. 1-11, the splice area 38 is mountable on the pivotable frame 34 on a side of the pivotable frame 34 that is opposite from the side holding the patch panel 30. In the examples shown in FIGS. 3-5, it can be appreciated that the plurality of cable radius limiters 36 are positioned along the edge of the pivotable frame 34 between the side holding the patch panel 30 and the side holding the splice area 38. In this example, the radius limiters 36 are arranged in a column along the edge.

In some embodiments, there can be a storage arrangement or "parking area" 51 (FIG. 1) for holding one or more unconnected cables that are not connected into the patch panel termination locations 32. The parking area 51 can include, for example, a housing or arrangement such as described in U.S. Pat. No. 7,218,827, incorporated herein by reference. The parking area 51 can also include, for example, any type of structure (e.g., a foam block) that uses friction to hold the unconnected cables.

In reference now to FIGS. 7-11, in this example, the pivotable frame 34 includes a pivot section 40 and a holding section 42. The pivot section 40 is pivotally connected to the framework 24. For example, the pivot section 40 can be connected to the framework 24 by a hinge 44.

The holding section 42 has first and second opposite sides 46, 48. The first side 46 holds the patch panel 30, and the second side 48 holds the splice area 38. The radius limiters 36 are positioned along the edge of the holding section 42 between the first side 46 and second side 48.

The holding section 42 is angled at a non-zero angle relative to the pivot section 40. In the example shown, the holding section 42 is angled at about 80-100 degrees, for example, about 90 degrees, relative to the pivot section 40.

In use, when it is desired to access the splice area 38, the pivotable frame 34 is pivoted about the hinge 44 to move the frame 34 from the storage position (FIGS. 2 and 7) to the access position (FIGS. 11 and 6). This exposes the splice area 38 and allows access to the splice area 38. The frame 34 can be pivoted about an angle from the storage position (at 0°) to the access position (90-150°) for servicing or access to the splice area 38.

FIGS. 12-20 illustrate another embodiment of system 20. Much of the structure is similar and will use the same reference numerals and rely upon the description above with respect to the embodiment of FIGS. 1-11. In this embodiment, the pivotable frame 34 is itself the patch panel 30. The patch panel 30 pivots between the storage position (FIGS. 12, 13, 18) and the access position (FIGS. 15-17, 19, 20).

Figure 12:
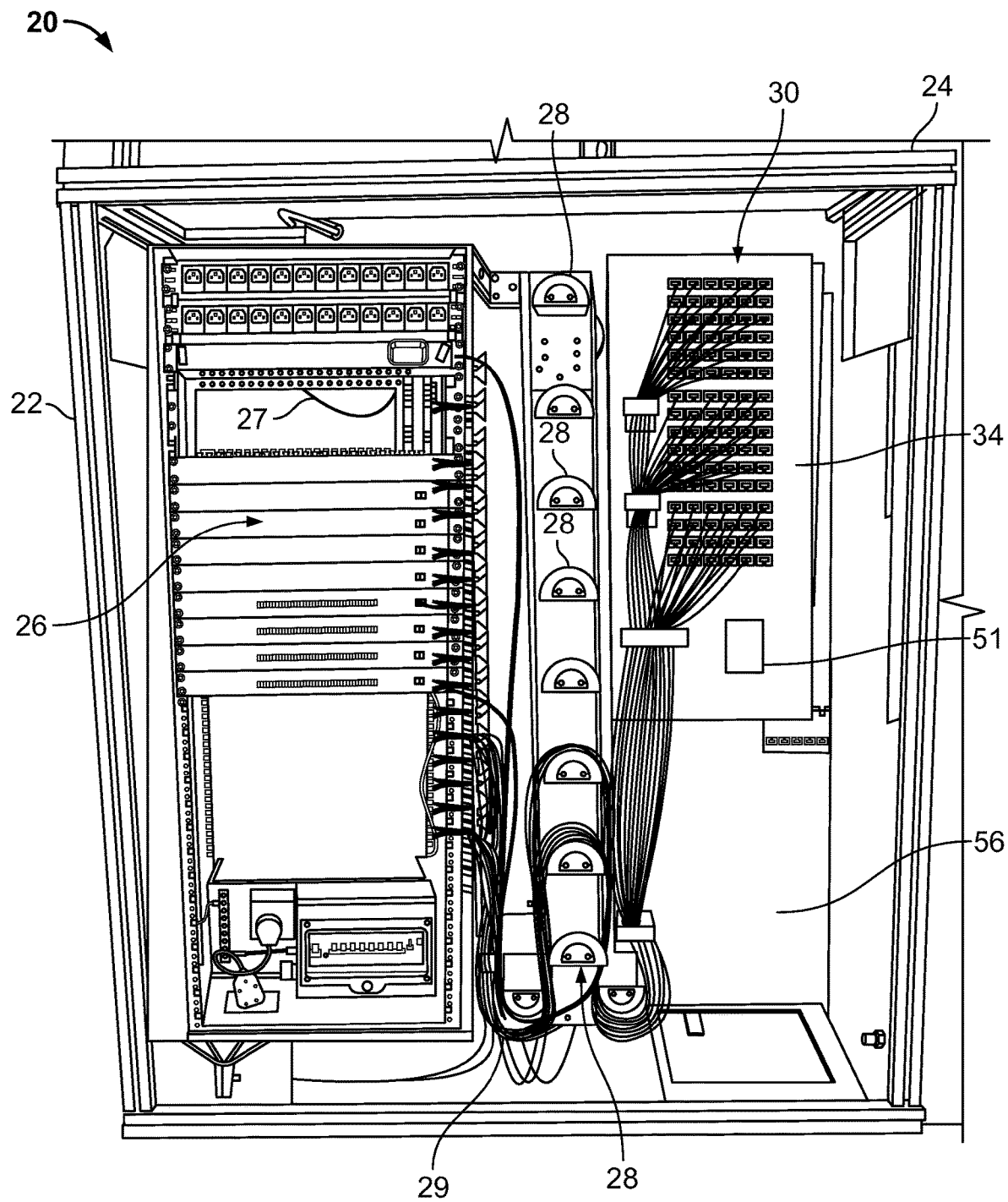
FIG. 12 is a perspective view of another embodiment of a telecommunications system utilizing a patch panel mounted on a pivotable frame, the pivotable frame being shown in a storage position, constructed in accordance with principles of this disclosure.
Figure 13:
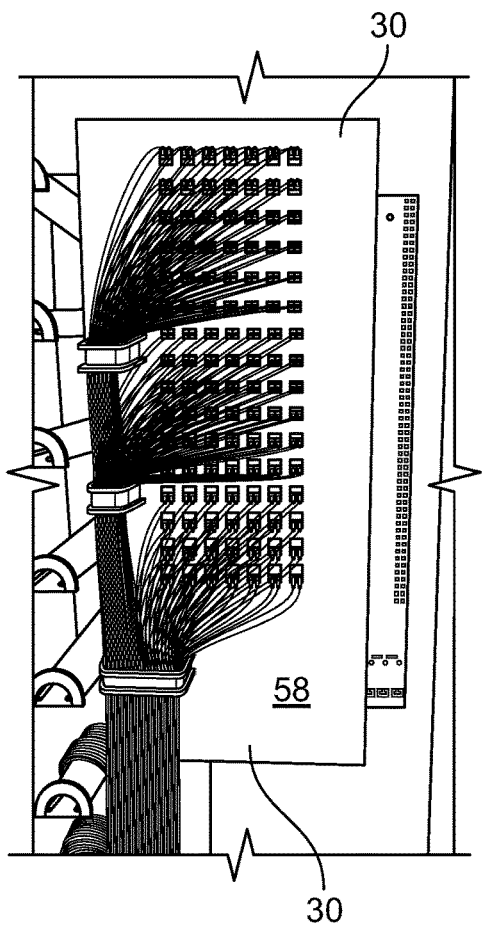
FIG. 13 is a perspective view of the patch panel of FIG. 12, depicted in the storage position.
Figure 14:
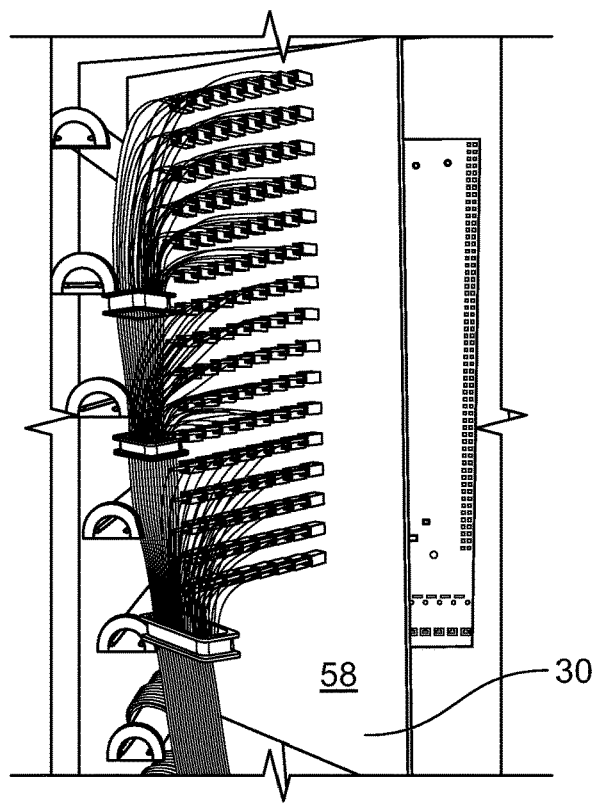
FIG. 14 is a perspective view of the patch panel as it is being pivoted from the storage position to an access position.
Figure 15:
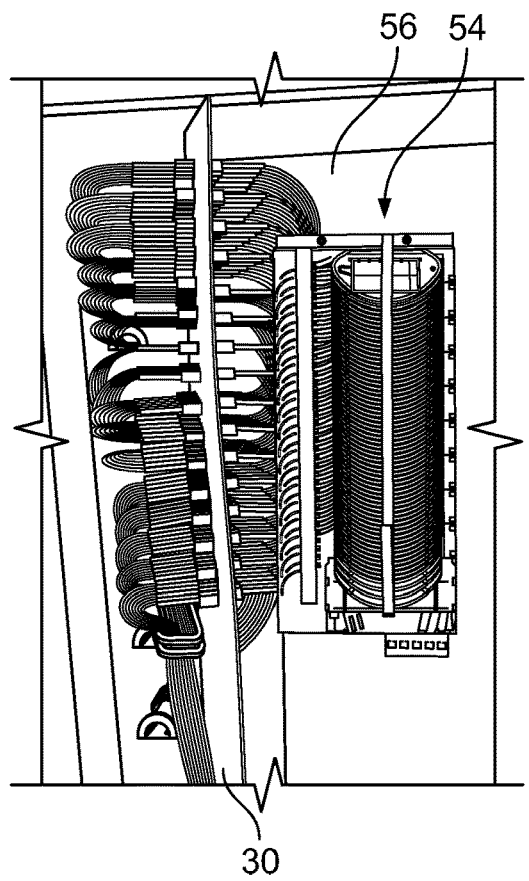
FIG. 15 is a perspective view of the patch panel of FIGS. 13 and 14 pivoted to an access position to expose a splice area mounted on a back wall of the cabinet.
Figure 16:
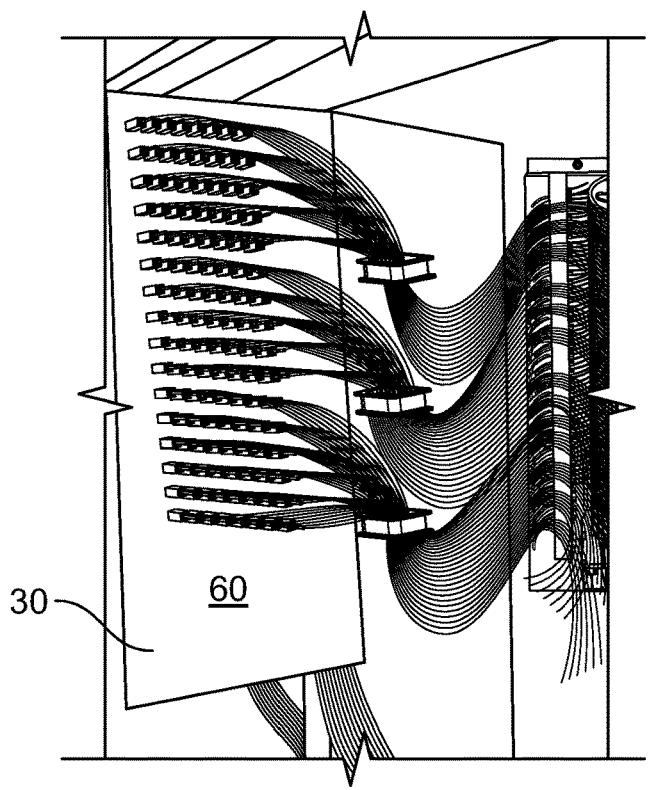
FIG. 16 is another perspective view of the patch panel of FIGS. 13-15 pivoted in the access position, showing the back of the patch panel and showing the area where the splice area would be.
Figure 17:
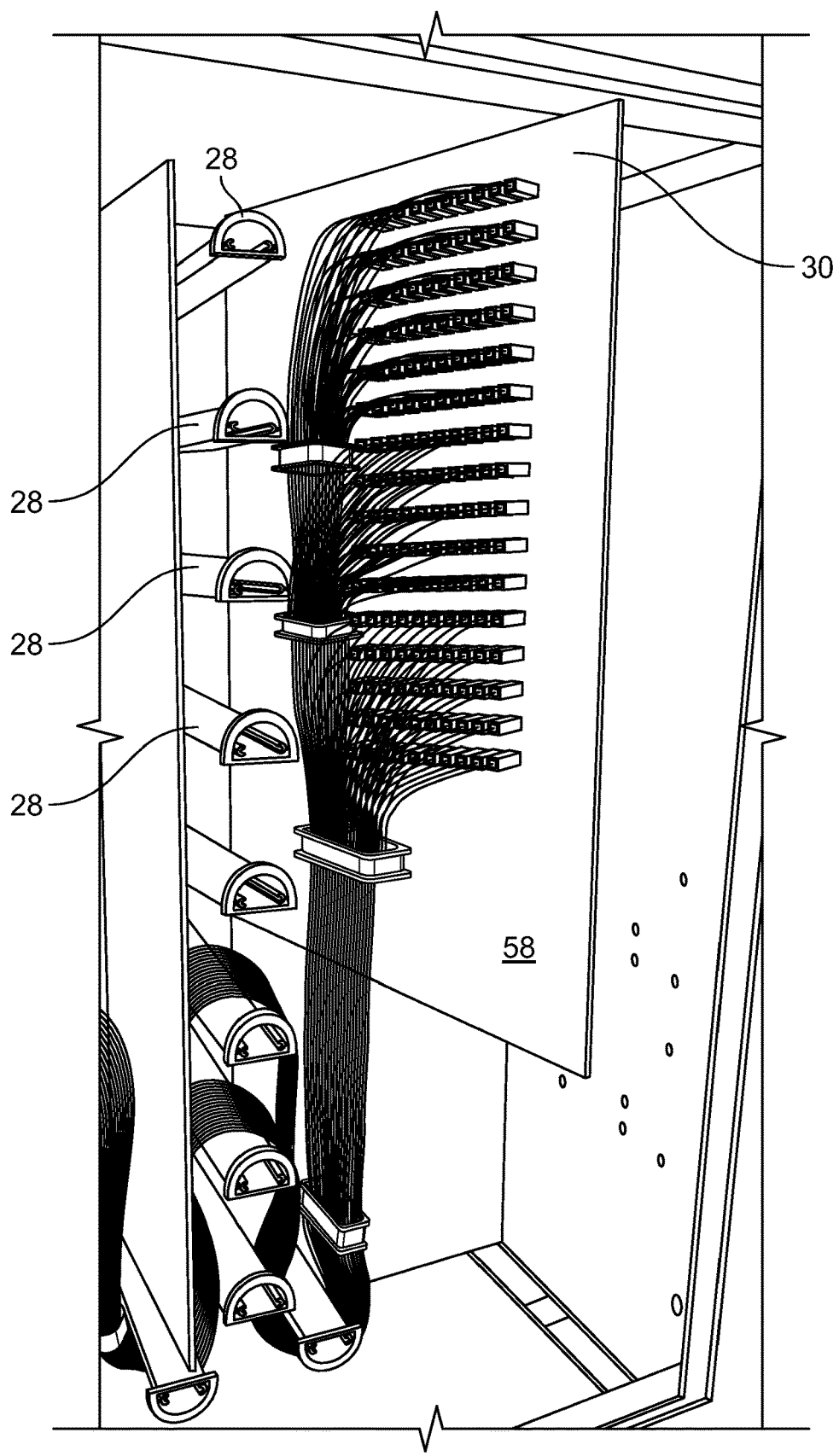
FIG. 17 is a perspective view of the patch panel of FIGS. 13-16 depicting the patch panel in the access position and showing the front of the patch panel.
Figure 18:
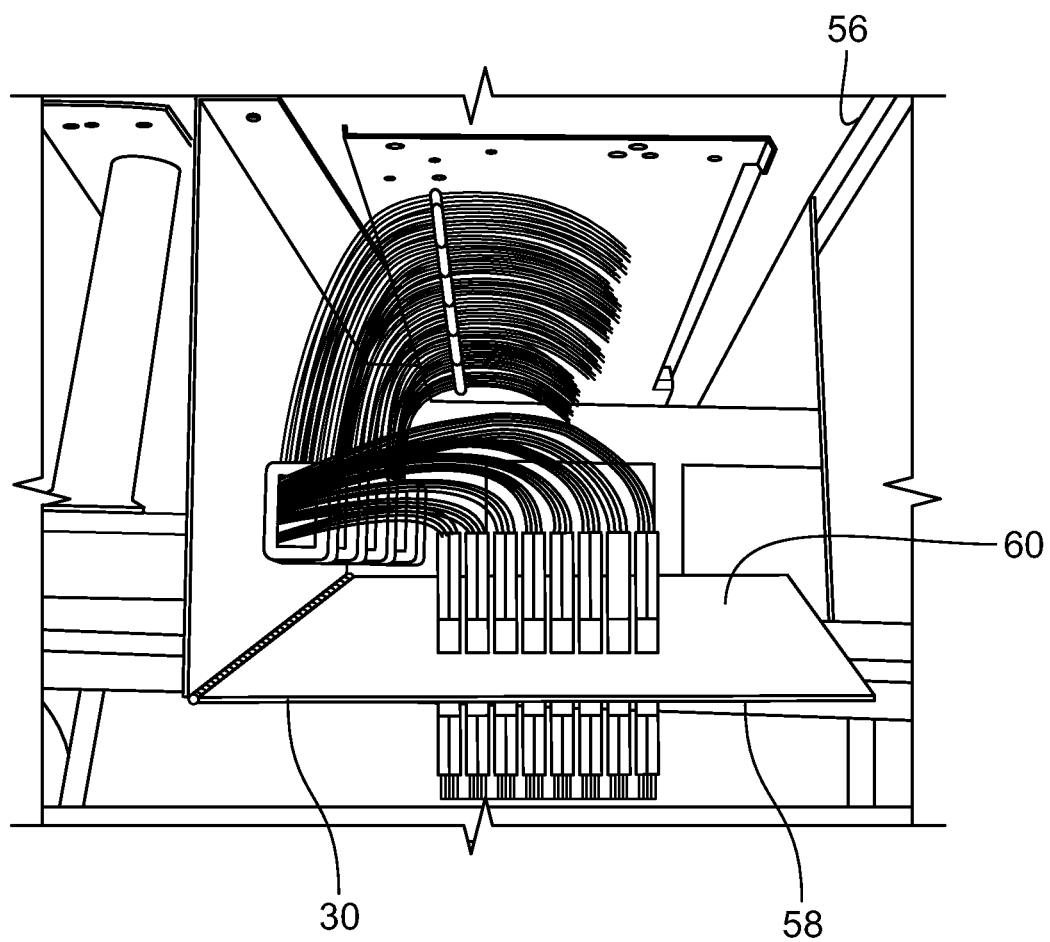
FIGS. 18-20 are top views of the patch panel of FIGS. 13-17 and showing various positions as it is rotated from the storage position (FIGS. 13 and 18) to the access position (FIGS. 16 and 20)

In the embodiment of FIG. 12, when the patch panel 30 is pivoted from the storage position to the access position, it exposes the splice area, shown here in FIG. 15 at reference numeral 54. In this embodiment, the splice area 54 is mounted on a wall 56, which in this embodiment, is at the rear of the cabinet 22. When the patch panel 30 is in the storage position, the splice area 54 is covered and protected by the patch panel 30. When the patch panel 30 is in the access position, it exposes and uncovers the splice area 54 on the wall 56.

Figure 19:
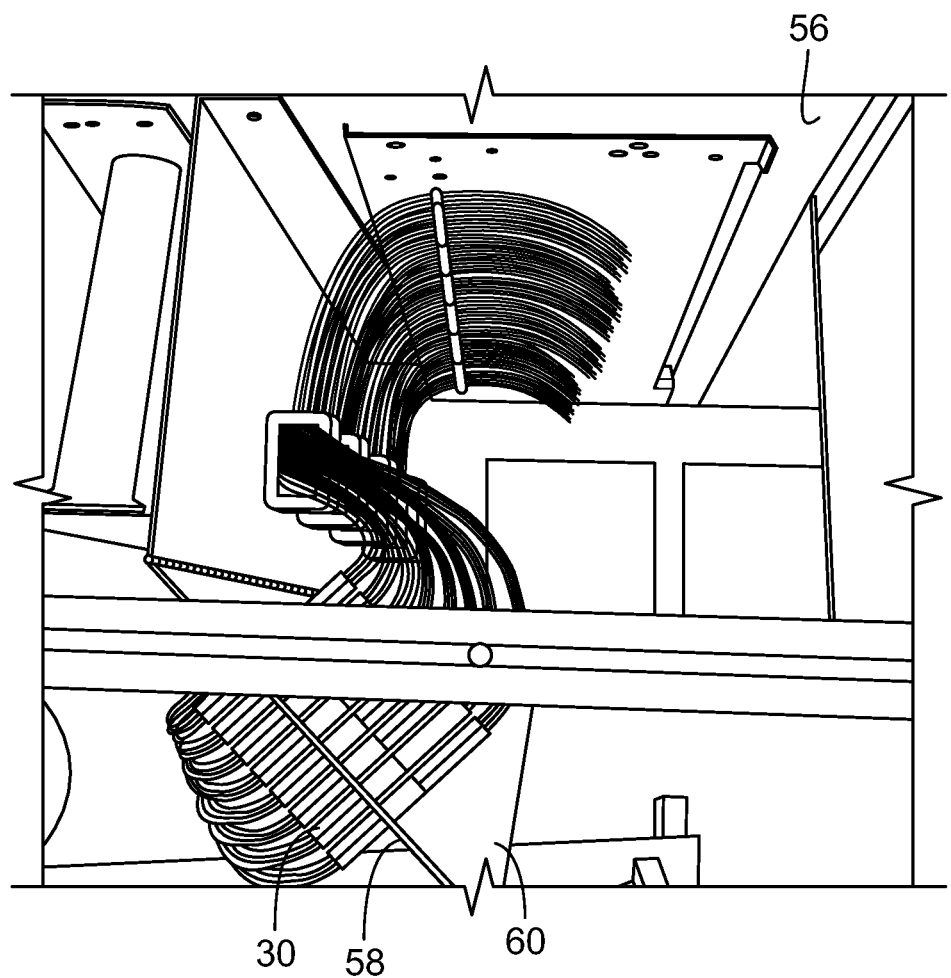
Figure 20:
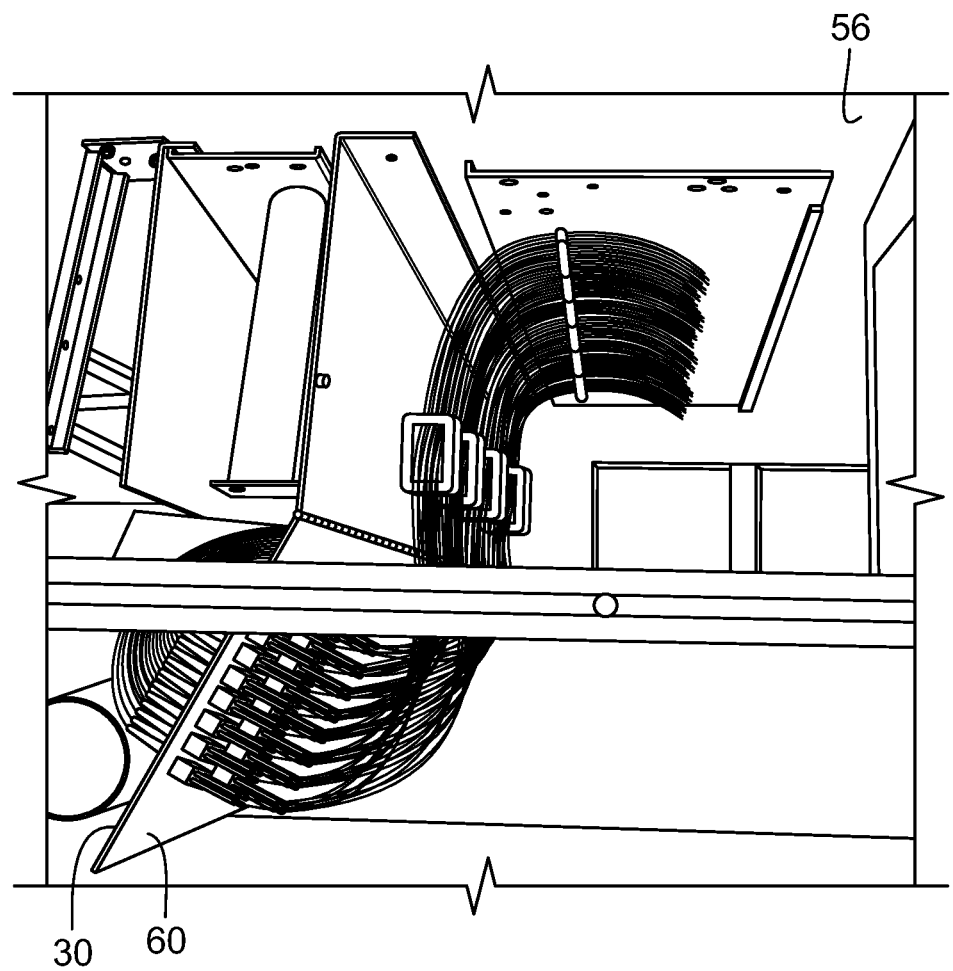

In this embodiment, the patch panel has a first side 58 and an opposite second side 60. In the storage position, the second side 60 will be generally parallel to and in opposition to the splice area 54. In the access position, the patch panel 30 is rotated relative to the wall 56 and the splice area 54. The angle can be, for example, between 60° and 150°. See, for example, FIG. 18 in which the storage position shows the patch panel 30 as generally parallel to the splice area 54. FIG. 19 shows the patch panel 30 at an angle of about 60° relative to the splice area 54. In FIG. 20, the patch panel 30 is about 120° relative to the splice area 54.

FIGS. 16 and 18-20 show the wall 56 prior to the splice area 54 being added. It should be understood that when the splice area 54 is added, it may have the appearance of a series of trays as shown in FIG. 15.

The system 20 is highly flexible. The system 20 of both embodiments of FIGS. 1 and 12 illustrate a cross-connect system; that is, a system which has cables between the equipment 26 and the patch panel 30/and between the patch panel 30 and the splice area. If it is desired to have, instead of a cross-connect system, an interconnect system, the patch panel 30 is removed allowing fiber optic cable to connect directly between the equipment 26 and the splice area.

The system 20 can be used in a method of organizing fiber optic cable. The method can include providing cabinet 22 including framework 24 for mounting telecommunications equipment 26.

Next, there is a step of mounting the telecommunications equipment 26 to the framework 24.

Next, there is a step of routing overlength slack in fiber optic cables in the cabinet to a plurality of spools 28 mounted within the cabinet 22.

Next, there is a step of connecting at least some of the fiber optic cables into patch panel 30 mounted within the cabinet 22. The patch panel 30 is mounted on a pivotable frame 34 between a storage position and an access position. The patch panel 30 includes cable radius limiters 36. The spools 28 are positioned intermediate the telecommunications equipment 26 and the patch panel 30.

Next, there can be a step of pivoting the pivotable frame 34 to the access position and routing the fiber optic cables from the patch panel 30 to splice area 38 mounted within the cabinet 22 and accessible when the pivotable frame 34 is in the access position.

In some example methods, the step of routing fiber optic cables to the splice area 38 includes routing the cables to the splice area 38 mounted on the pivotable frame 34 on an opposite side from the patch panel 30.

Figure 21:
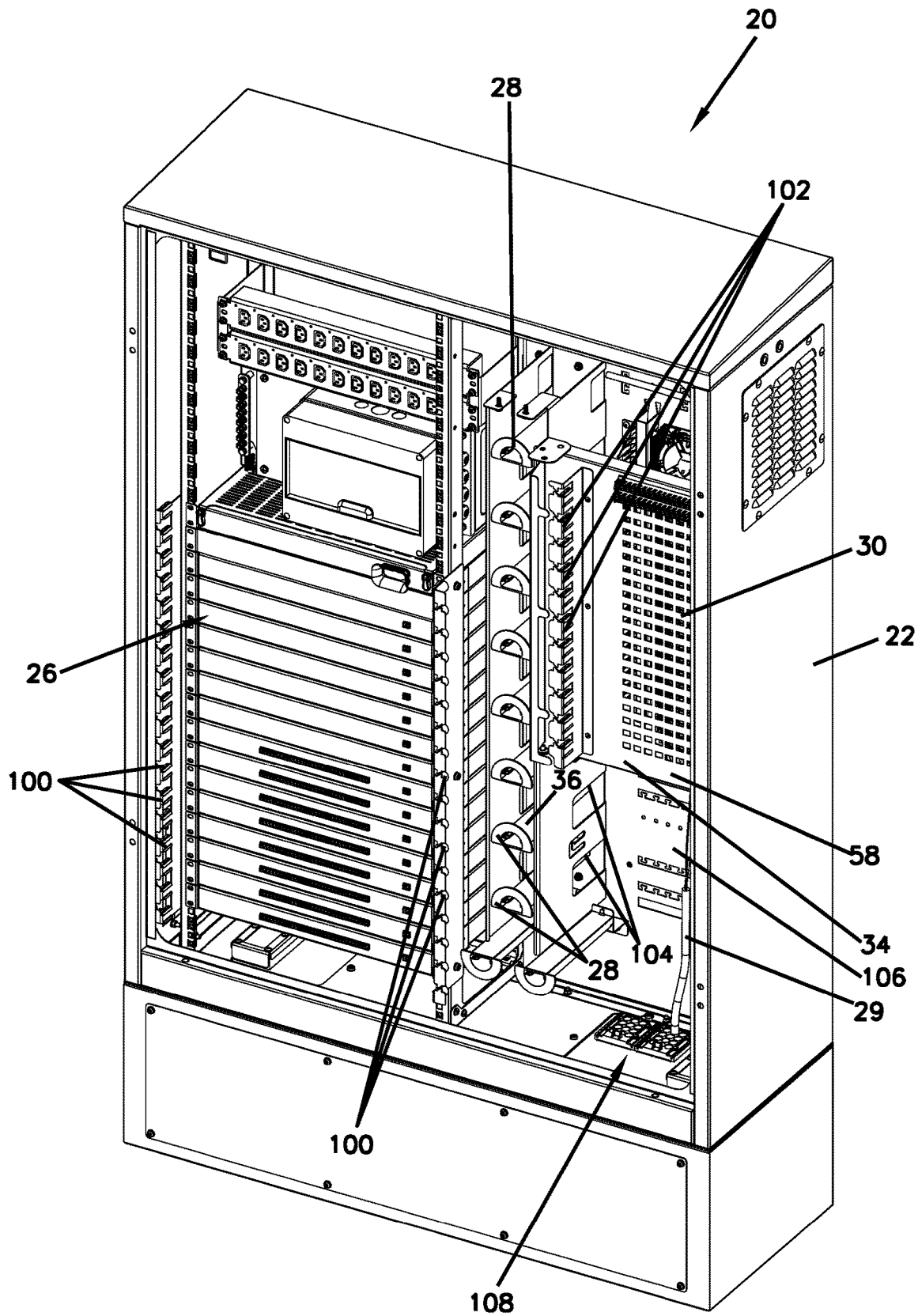
FIG. 21 is a perspective view of the embodiment of a telecommunications system shown in FIG. 12.

FIGS. 21-27 depict further views of the embodiment of FIG. 12. In FIG. 21, the system 20 is shown in perspective view. Much of the structure is similar and uses the same reference numerals and relies upon the description with respect to the embodiment of FIGS. 1-11.

Figure 23:
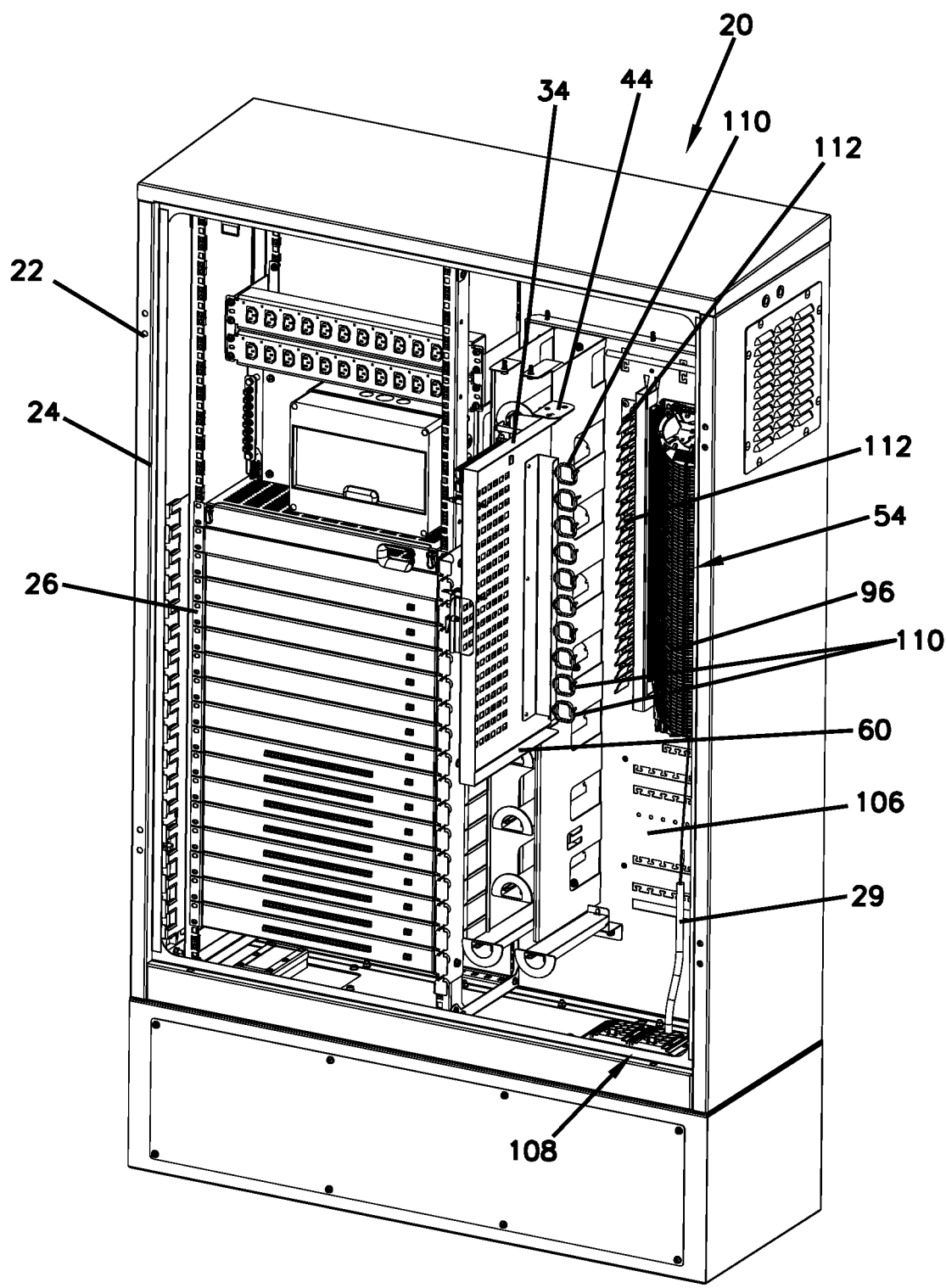
FIG. 23 is another perspective view of the system of FIG. 21, and showing the patch panel pivoted to an access position.
Figure 24:
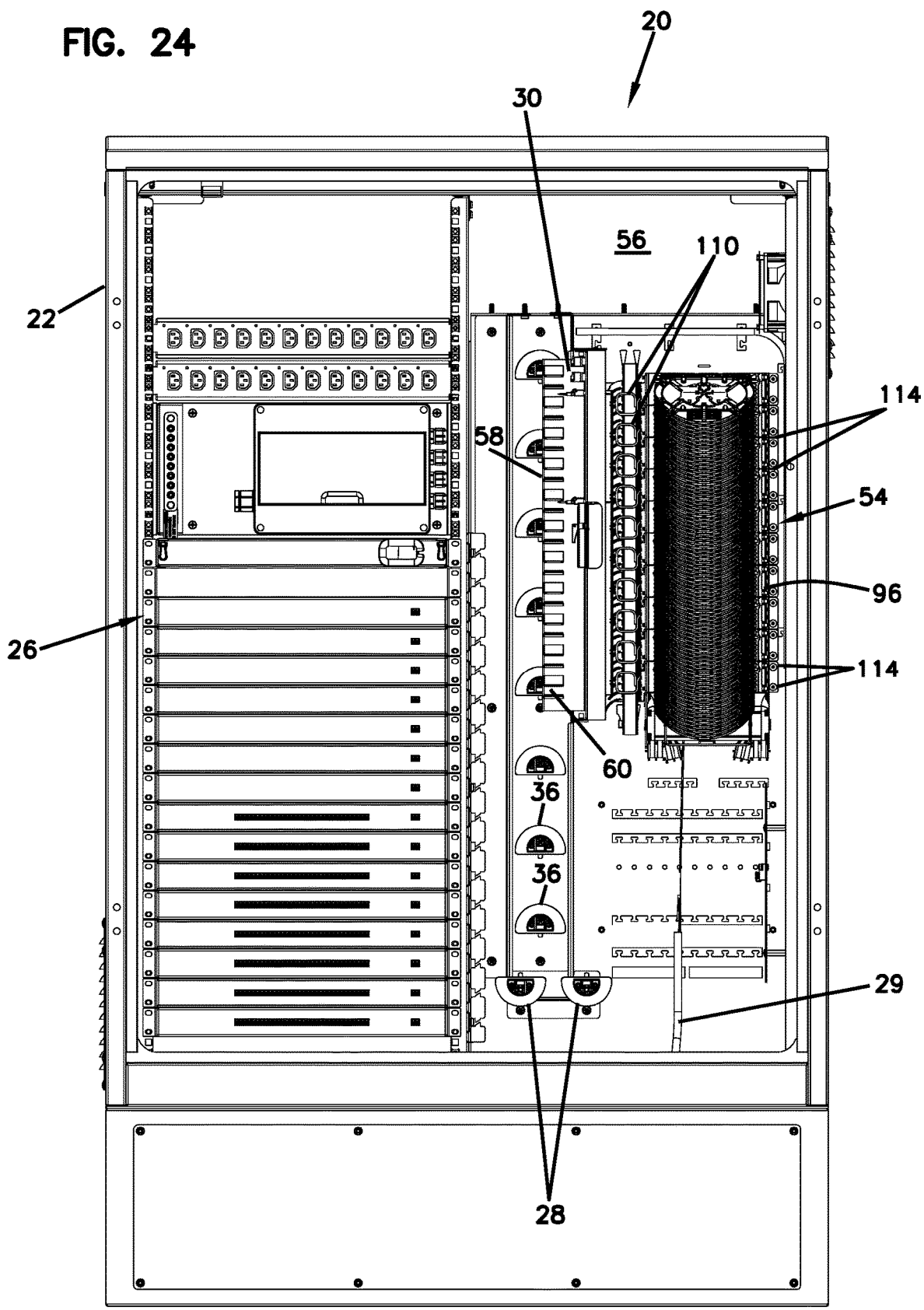
FIG. 24 is a front view of the system of FIG. 23.

The system 20 includes cabinet 22 with a rack or framework 24. Telecommunications equipment 26 can be shown arranged vertically in a row along one side of the cabinet 22. Adjacent to the equipment 26 is a plurality of slack storage members or spools 28. Next to the spools 28 is pivotable patch panel 30. The patch panel 30 pivots between the storage position (FIGS. 21, 22 and 26) and the access position (FIGS. 23, 24, 25, and 27). When the patch panel 30 is pivoted from the storage position to the access position, it exposes splice area 54 (FIGS. 23 and 24). The splice area 54 is mounted on the wall 56 which is at the rear of the cabinet 22. When the patch panel 30 is in the storage position, the splice area 54 is covered and protected by the patch panel 30. When the patch panel 30 is in the access position, it exposes and uncovers the splice area 54 on the wall 56.

FIG. 24 illustrates the splice area 54 along the wall 56. It includes a series of splice trays 52.

Figure 22:
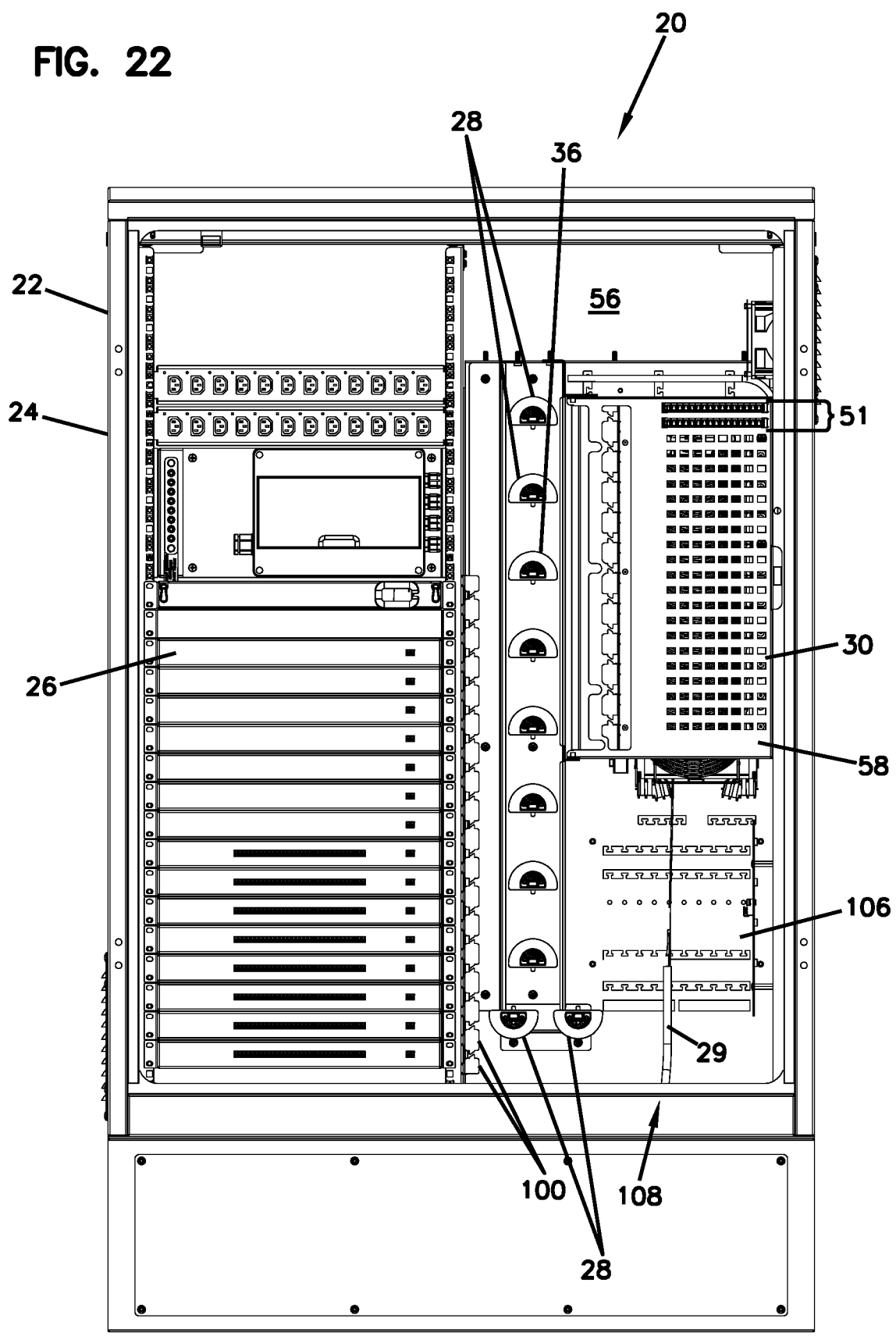
FIG. 22 is a front view of the system of FIG. 21.
Figure 25:
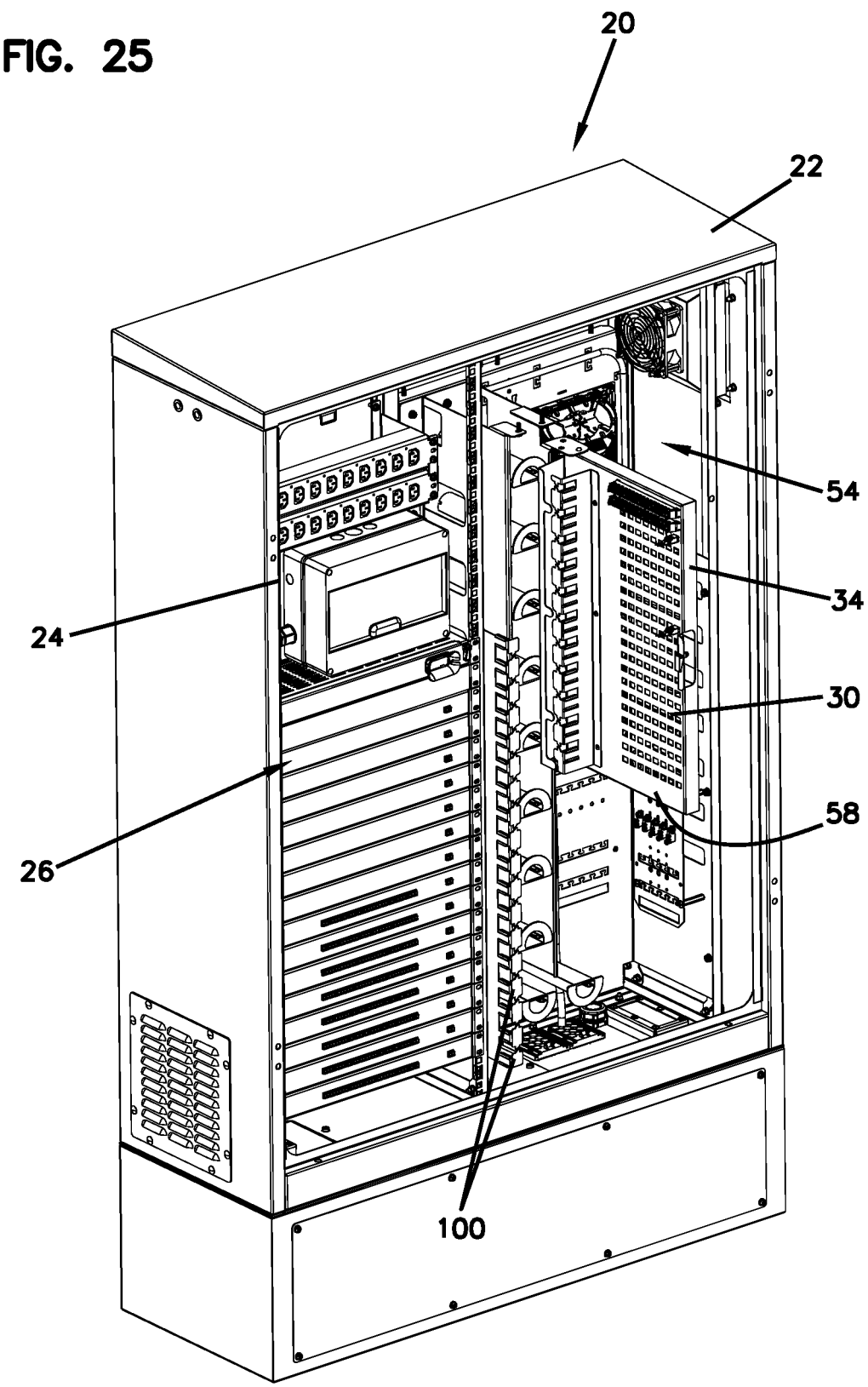
FIG. 25 is another perspective view of the system of FIG. 23 and showing the patch panel in the access position.

FIGS. 21 and 22 show the patch panel 30 in the storage position. In FIGS. 23-25, the patch panel 30 is pivoted to the access position, which is angled away from the splice area 54 to allow access to the splice area 54.

Figure 26:
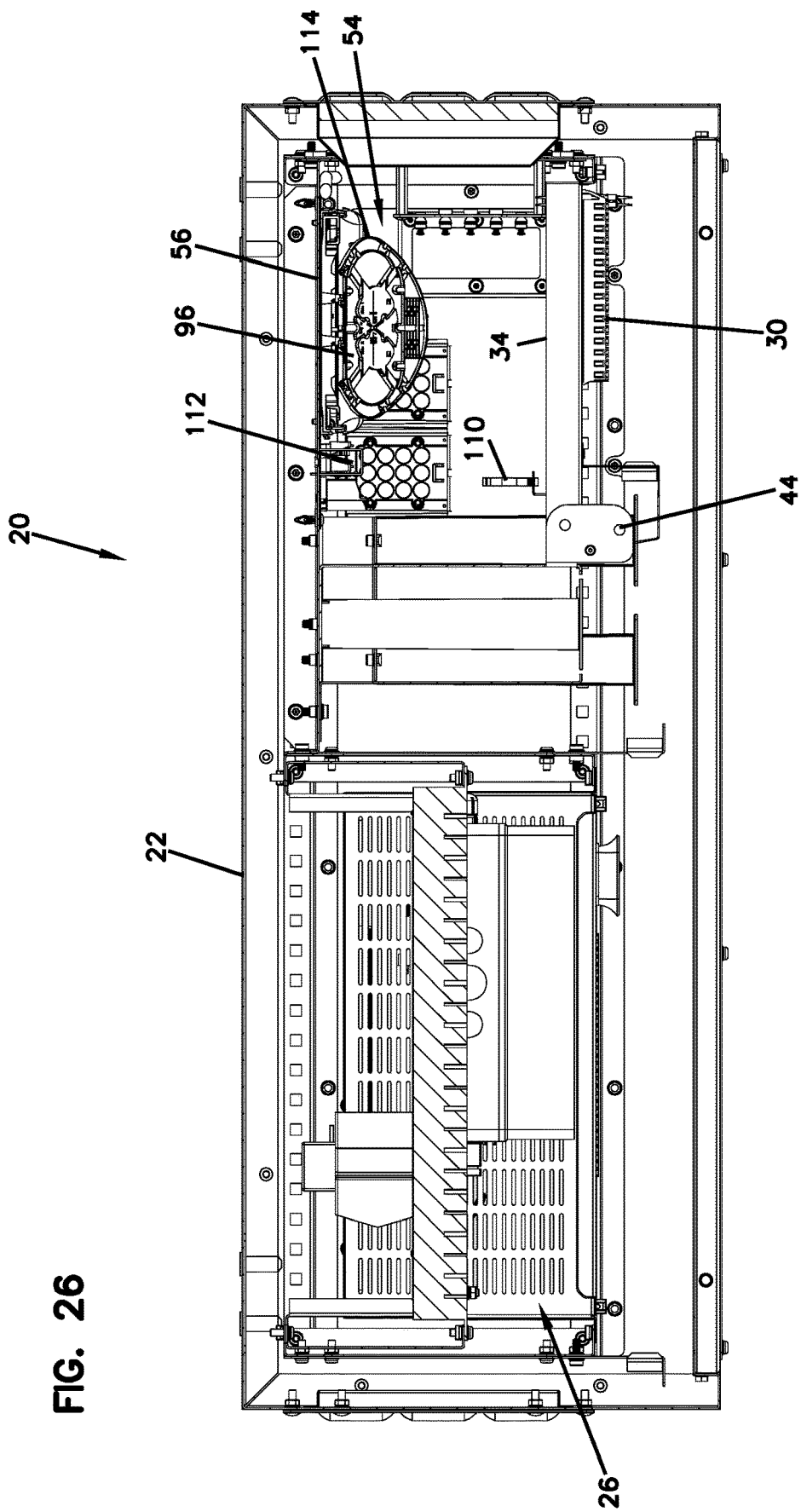
FIG. 26 is a top view of the system of FIG. 21.
Figure 27:
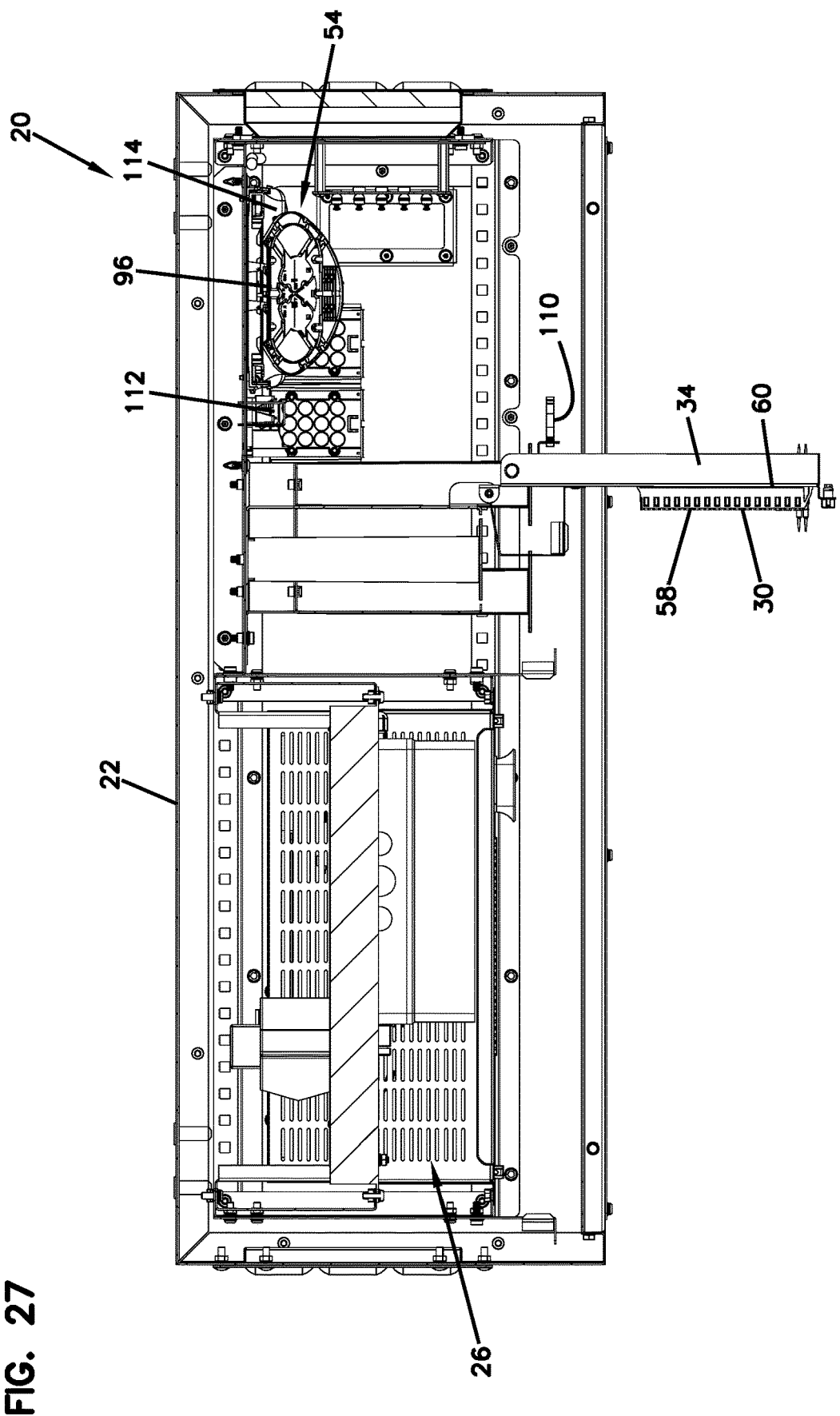
FIG. 27 is a top view of the system of FIG. 21 and showing the patch panel in the access position.

By comparing FIGS. 26 and 27, it can be seen how the patch panel 30 pivots from the storage position, in which the patch panel 30 is generally parallel to the rear wall 56 holding the splice area 54, to the access position in FIG. 27 in which the patch panel 30 is pivoted away from the splice area 54 and extends outside of the enclosure of the cabinet 22. In FIG. 27, the patch panel 30 is pivoted to be about 90° relative to the rear wall 56 of the cabinet 22. It should be understood that the patch panel 30 can be pivoted farther than 90°, to at least about 120° relative to the splice area 54.

The system 20 in the embodiment of FIGS. 21-27 may include various structures for managing cables for routing, organizing, and preventing sharp radii. For example, cable managers 100 are adjacent to the equipment 26, and in FIG. 21, they are along opposite sides of the equipment 26. There are also cable managers 102 located between the patch panel 30 and the spools 28. Access openings 104 are also provided below the patch panel 30 and adjacent to the spools 28. A clamping area 106 is provided between a cable port area 108 in the cabinet 22 and the splice area 54. In FIG. 23, when the patch panel 30 is in the access position, cable rings 110 are visible and are attached to the second side 60 of the patch panel 30. Also in FIG. 23, radius limiters 112, adjacent to the splice area 54, can be seen. The radius limiters 112 are attached to the rear wall 56. In FIG. 24, cable managers 114 are visible along side the splice area 54 next to a wall of the cabinet 22.

FIGS. 28-38 illustrate another embodiment of a telecommunications system 20. Much of the structure of the system 20 of FIGS. 28-38 is similar and will use the same reference numerals and rely upon the description above with respect to the embodiment of FIGS. 1-11 and 12-20. In this embodiment, the equipment 26 includes at least one splitter module 80. The splitter module 80 is the type of module that is known in the art and may contain either passive optical splitters or wavelength division multiplexors. The splitter modules 80 can be many types of configurations, and in this embodiment, the splitter modules 80 are 1×16 splitters.

Figure 31:
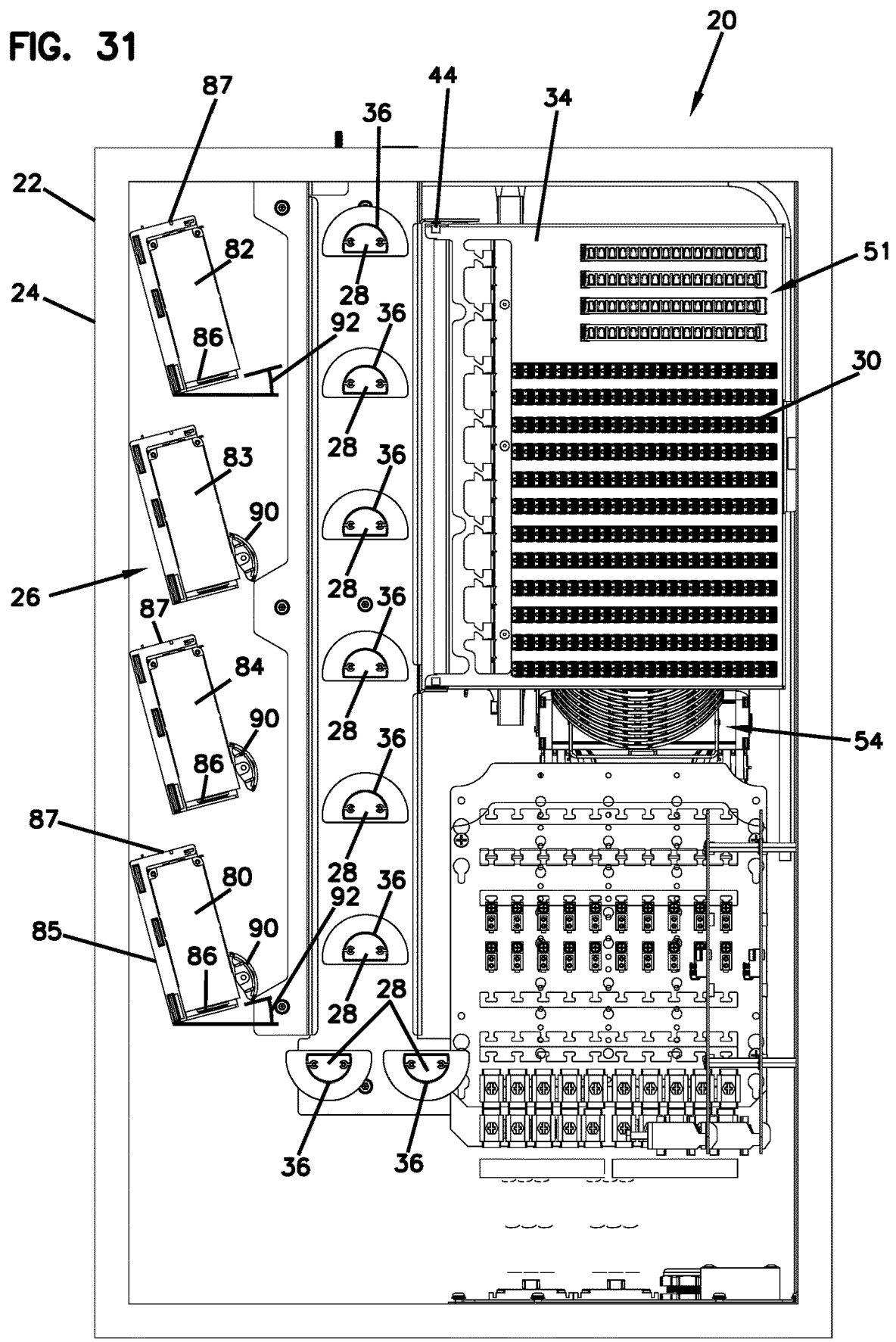
FIG. 31 is a front view of the system of FIG. 28, the patch panel being shown in the storage position.

In this embodiment, the telecommunications equipment 26 includes a plurality of splitter modules 80. As can be seen in FIG. 31, the splitter modules 80 include at least two groups of splitter modules 80 which can include a first group 82, second group 83, third group 84, and fourth group 85. Each group 82-85 has more than one splitter module 80.

In the illustrated embodiment, the groups 82-85 are arranged vertically relative to each other. Each group 82-85 has a base portion 86, which is along a bottom, and an upper portion 87, which is along a top. Each group 82-85 can be arranged so that the base portion 86 is angled toward the spools 28 and patch panel 30 relative to the upper portion 87 of each group 82-85. This arrangement provides advantage in that optical fibers (e.g., pigtails 98, FIG. 38) extending from each group 82-85 do not dangle down and interfere with another one of the group 82-85.

Figure 32:
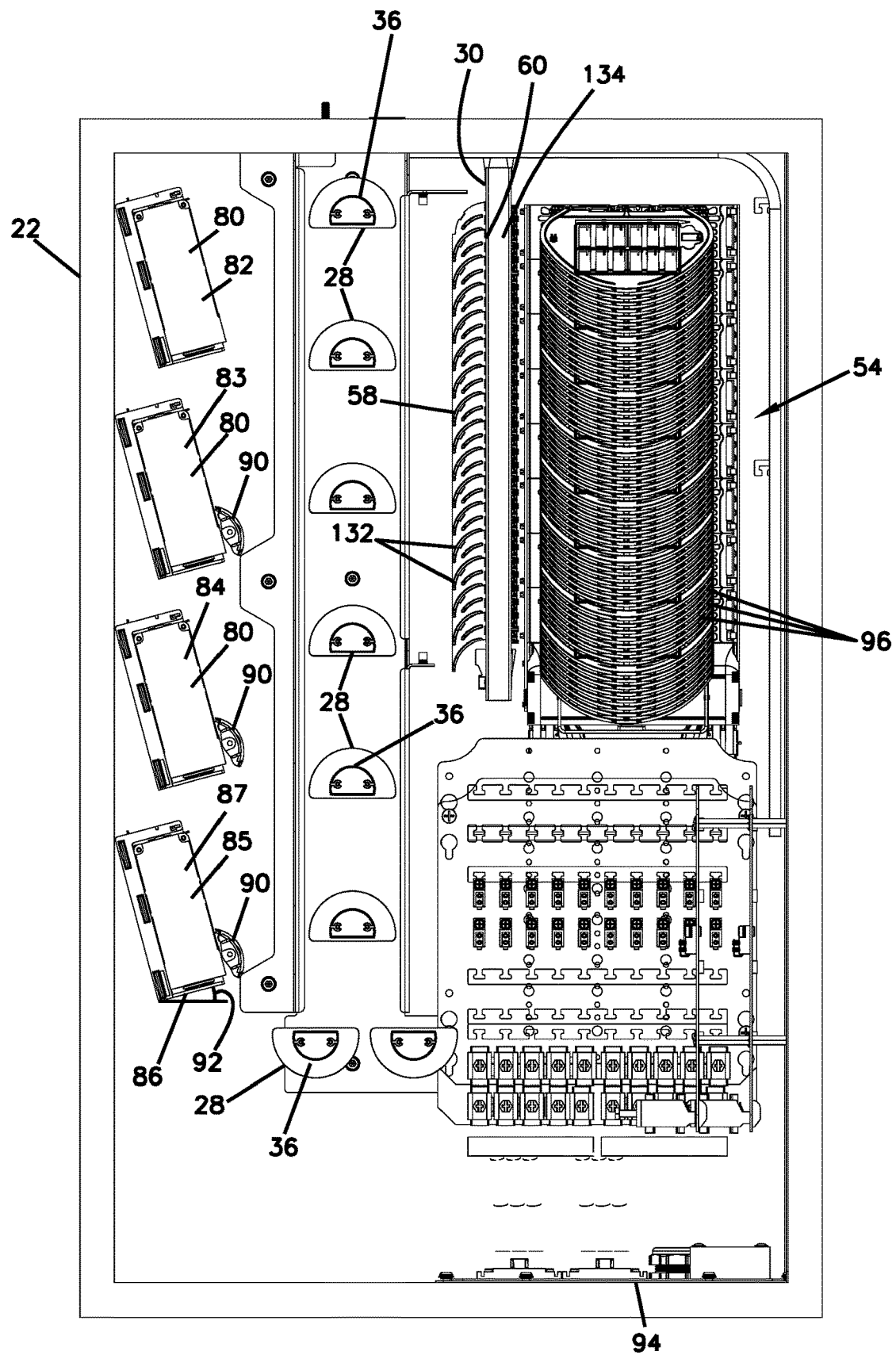
FIG. 32 is a front view of the system of FIG. 28, with the patch panel being omitted for purposes of illustration.
Figure 33:
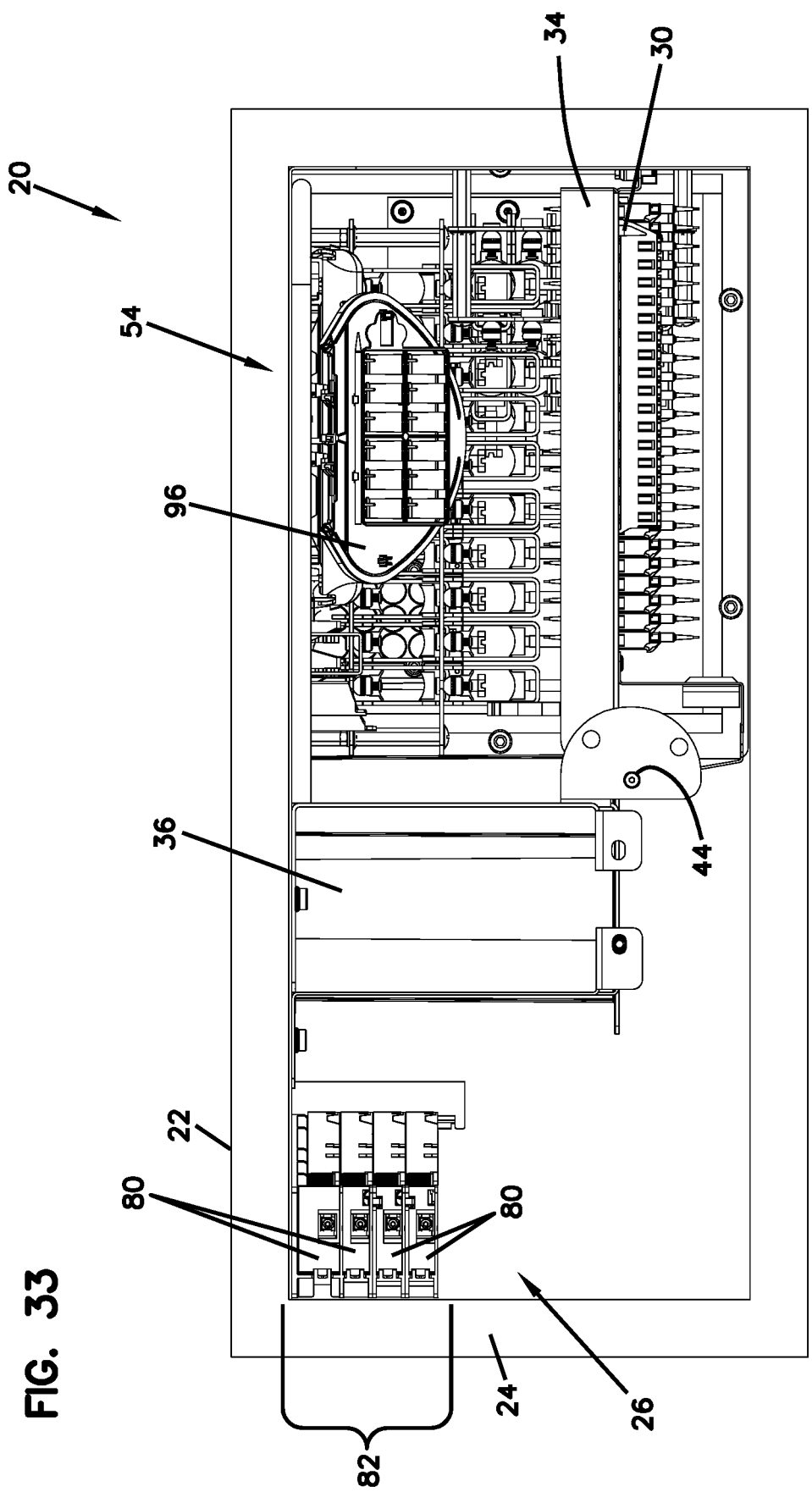
FIG. 33 is a top view of the system of FIG. 28, the patch panel being in the storage position.

In the embodiment of FIGS. 31 and 32, it can be seen how the second group 83, third group 84, and fourth group 85 of splitter modules 80 include a radius limiter 90 to help direct the optical fibers (pigtails 98) from the groups 83, 84, 85.

Many different embodiments are possible. In the one illustrated, each group 82-85 includes at least four splitter modules 80.

Again in reference to FIG. 32, while the splitter modules 80 are illustrated as being at an angle, they may also be non-angled. However, it has been found to be advantageous when the groups 82-85 of splitter modules 80 are angled, as shown at reference numeral 92 in FIGS. 31 and 32. The angle 92 is measured from the base portion 86 to a horizontal, parallel to the ground or the bottom of the cabinet 22. Angle 92 can be 5-40°, for example, 10-30°.

Figure 28:
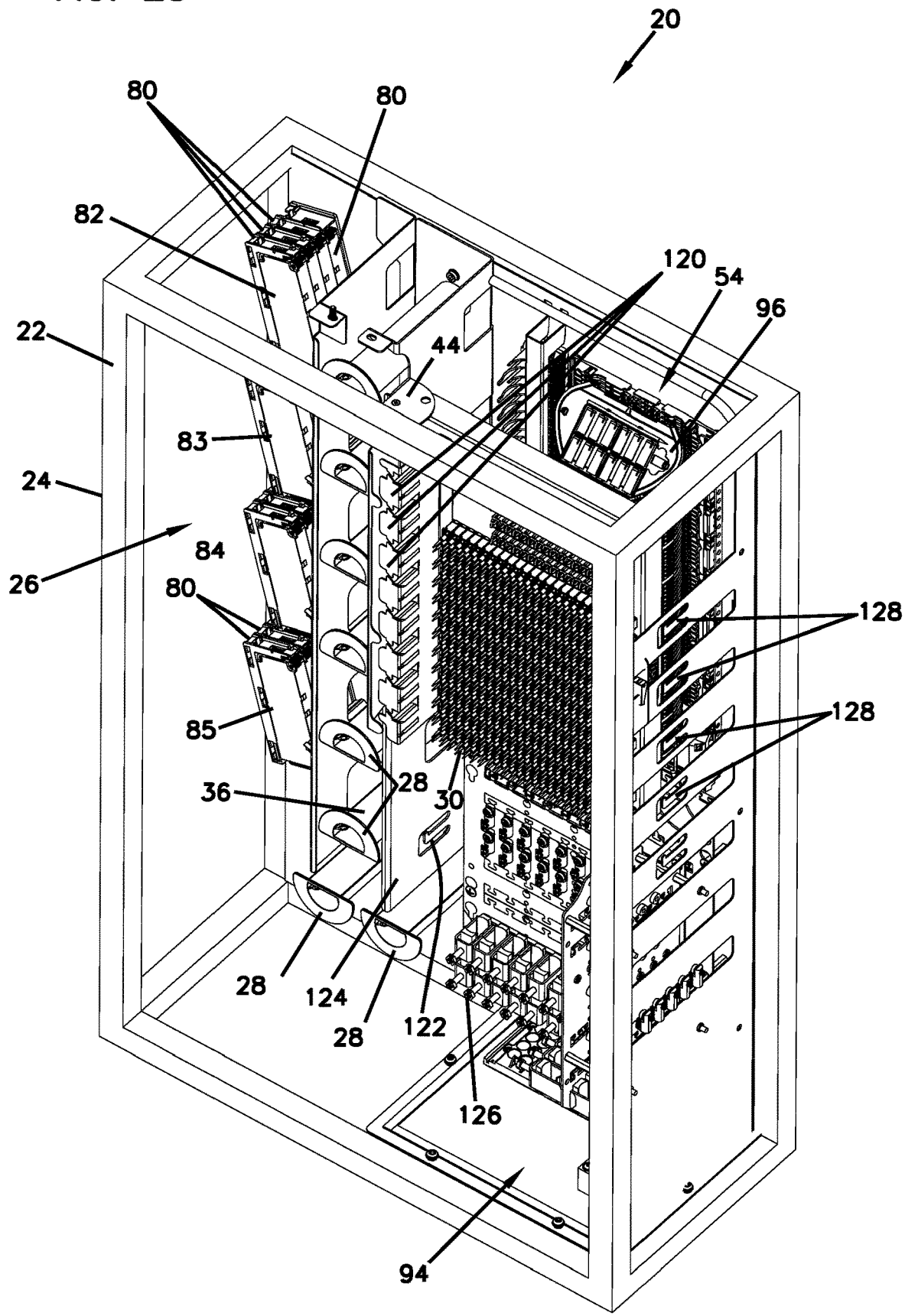
FIG. 28 is a perspective view of another embodiment of a telecommunications system utilizing a patch panel mounted on a pivotable frame, the pivotable frame being shown in a storage position, constructed in accordance with principles of this disclosure.
Figure 29:
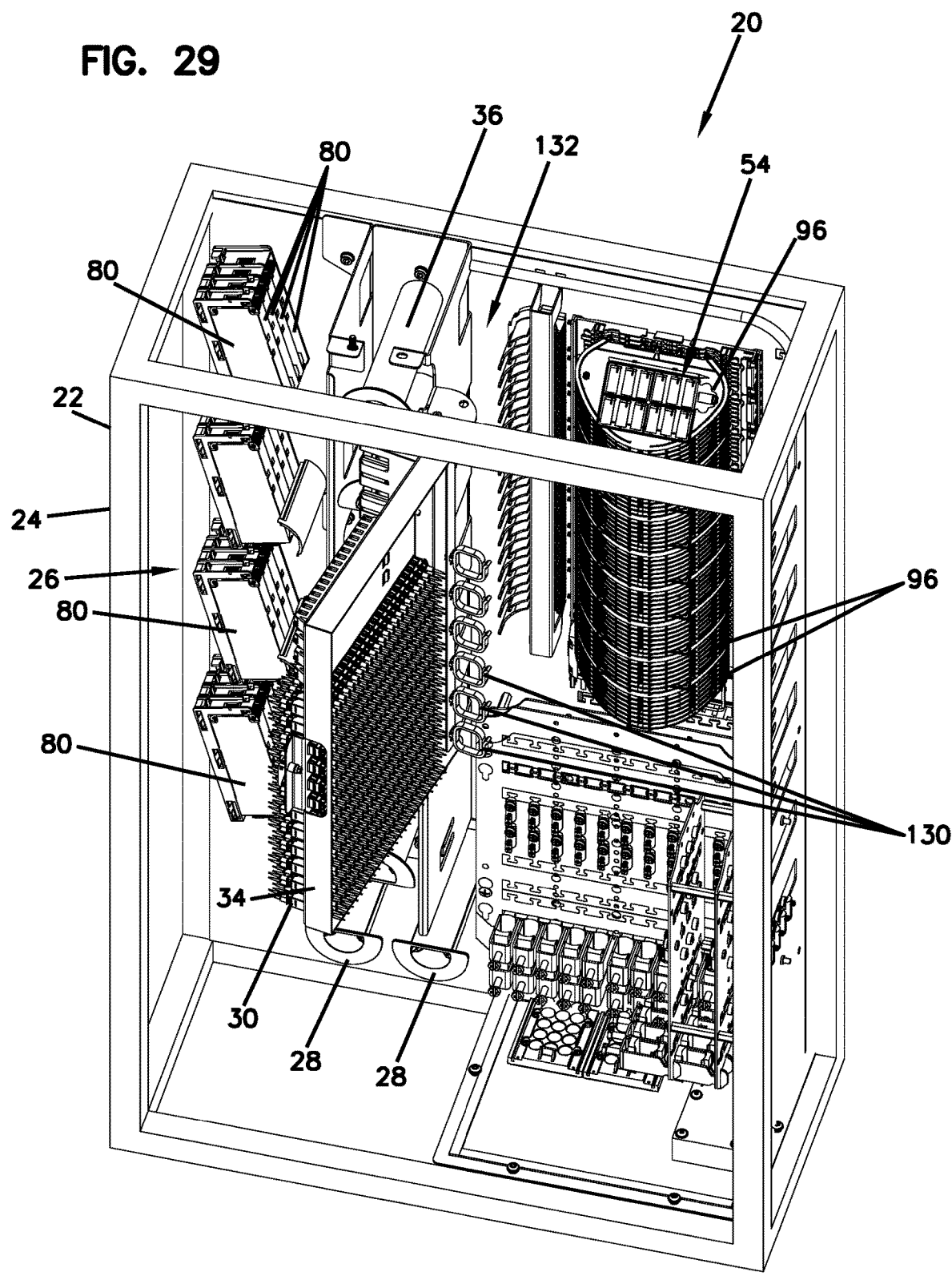
FIG. 29 is a perspective view of the system of FIG. 28 and showing the patch panel pivoted to the access position.
Figure 30:
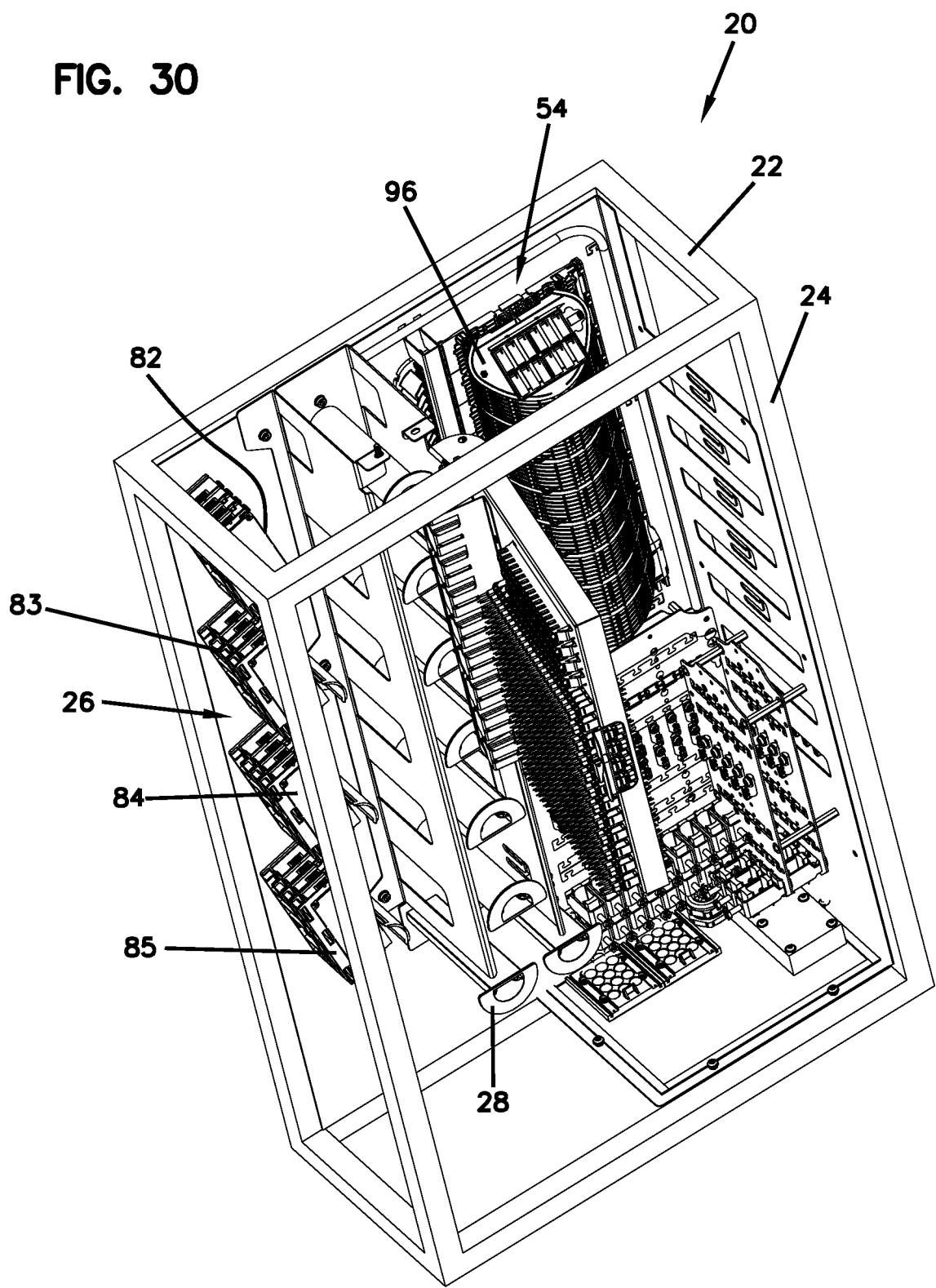
FIG. 30 is another perspective view of the system of FIG. 29 with the patch panel in the access position.
Figure 34:
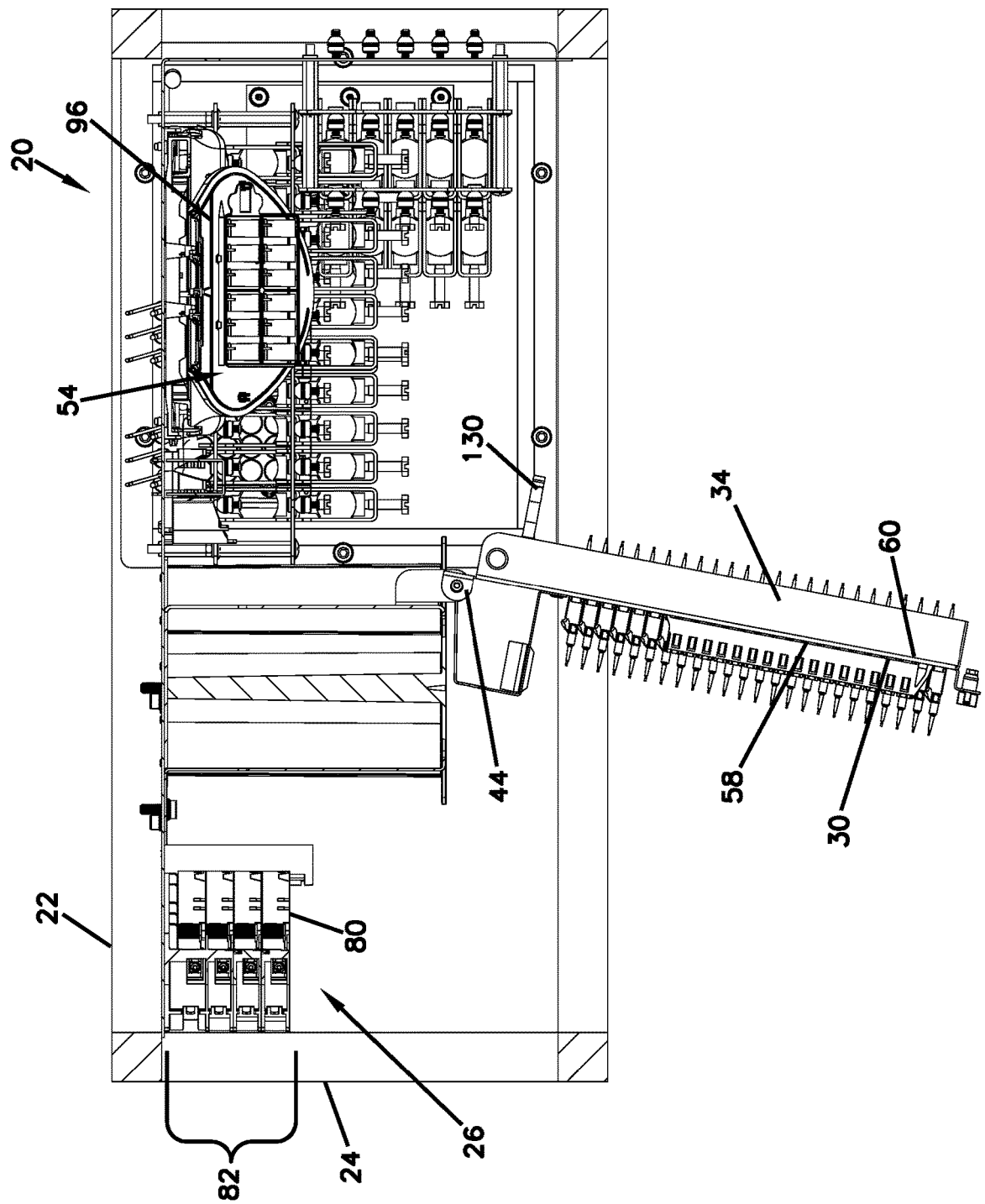
FIG. 34 is a top view of the system of FIG. 28, the patch panel being in the access position.
Figure 35:
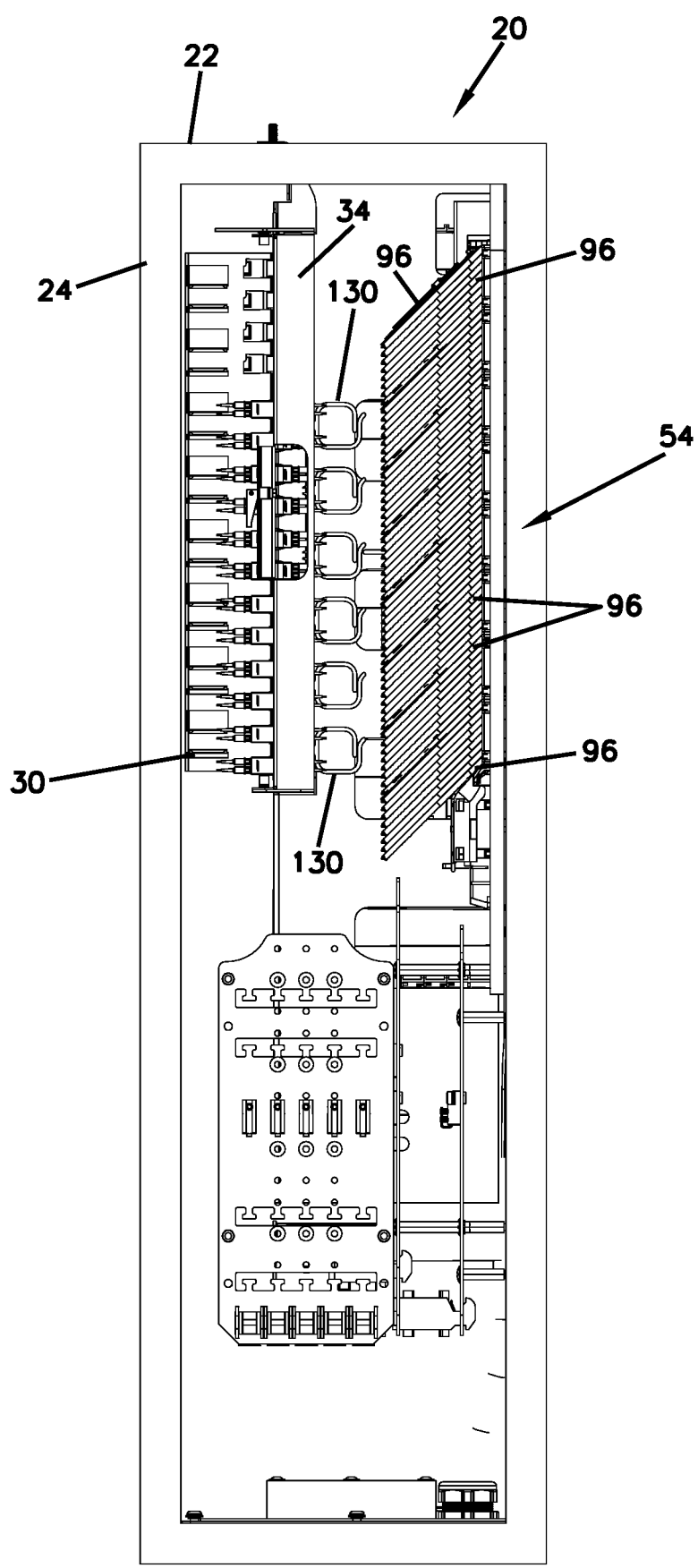
FIG. 35 is a side view of the system of FIG. 28, with the outer cabinet wall removed for purposes of illustration.

As with the embodiment of FIGS. 12 and 21, the patch panel 30 pivots or rotates from a storage position (FIGS. 28, 31, 33, and 35) to an access position (FIGS. 29, 30, and 34). The splice area 54 is mounted within the cabinet 22 and is accessible when the pivotable frame 34, holding the patch panel 30, is in the access position. The splice area 54 is used to receive fiber optic cables from the patch panel 30 for splicing to additional cables. In addition, the splice area 54 can be used with fiber optic cables having a signal coming from the service provider. An example of a fiber optic cable with a signal from a service provider, and how it is routed through the cabinet 22 is illustrated schematically in FIG. 38 and discussed below.

As with the embodiment of FIGS. 21-27, the FIG. 28 embodiment may include various structures for managing cables for routing, organizing, and preventing sharp radii. For example, cable managers 120 are located between the patch panel 30 and the spools 28. Access opening 122 is located in a wall 124 between the patch panel 30 and the spools 28. A clamping area 126 is provided between cable port area 94 in the cabinet 22 and the splice area 54. Cable tie-offs 128 are provided along a cabinet wall adjacent to the clamping area 126 and splice area 54. In FIG. 29, when the patch panel 30 is in the access position, cable rings 130 are visible and are attached to the second side 60 of the patch panel 30. Also in FIG. 29, radius limiters 132, adjacent to the splice area 54, can be seen. The radius limiters 132 are attached to the rear wall 56. In FIG. 24, cable managers 114 are visible along side the splice area 54 next to a wall of the cabinet 22. A channel cable holder 134 is used along the radius limiters 132.

Figure 36:
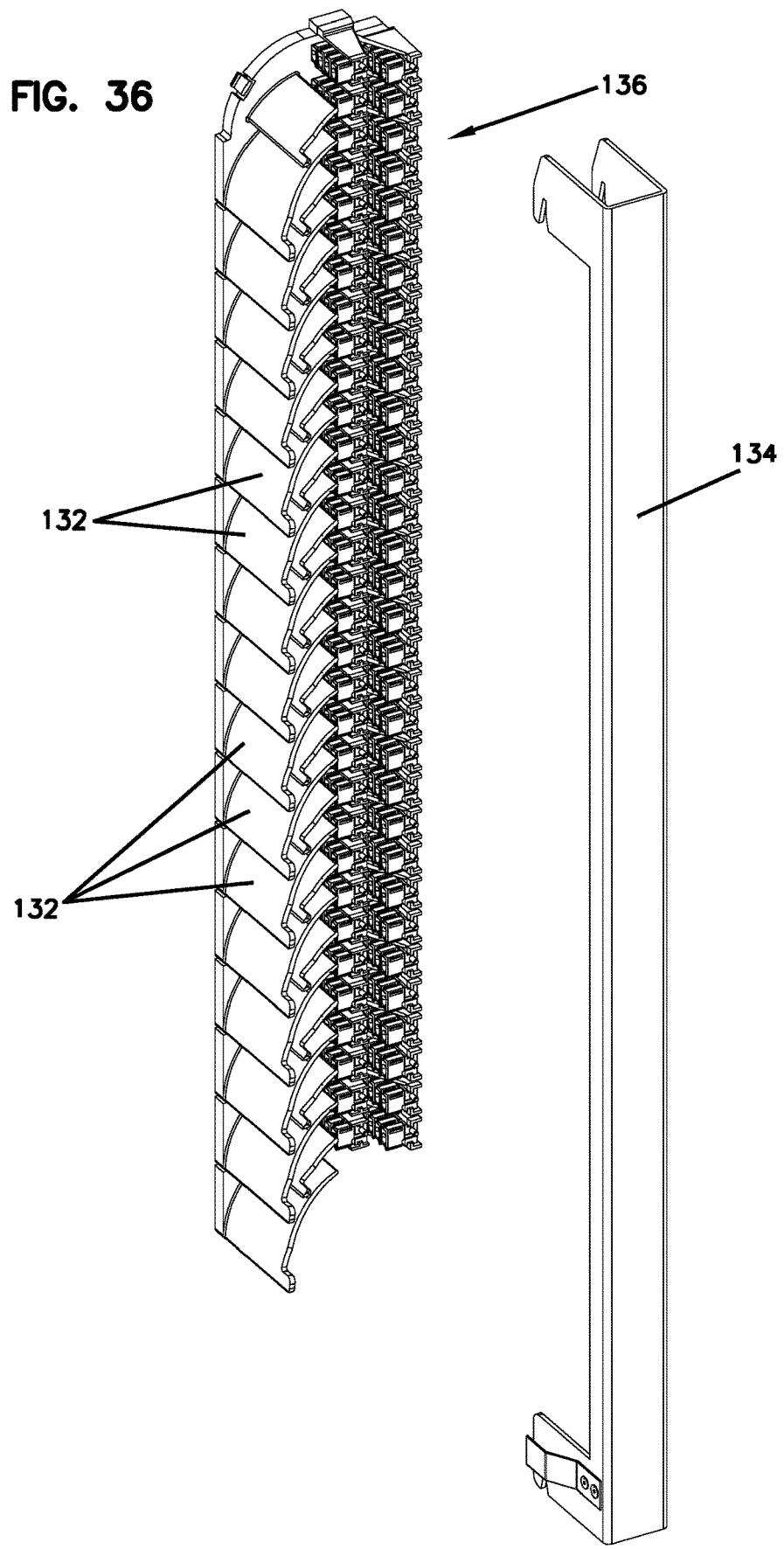
FIG. 36 is a perspective view of a portion of the cable management structure used in the system of FIG. 28.
Figure 37:
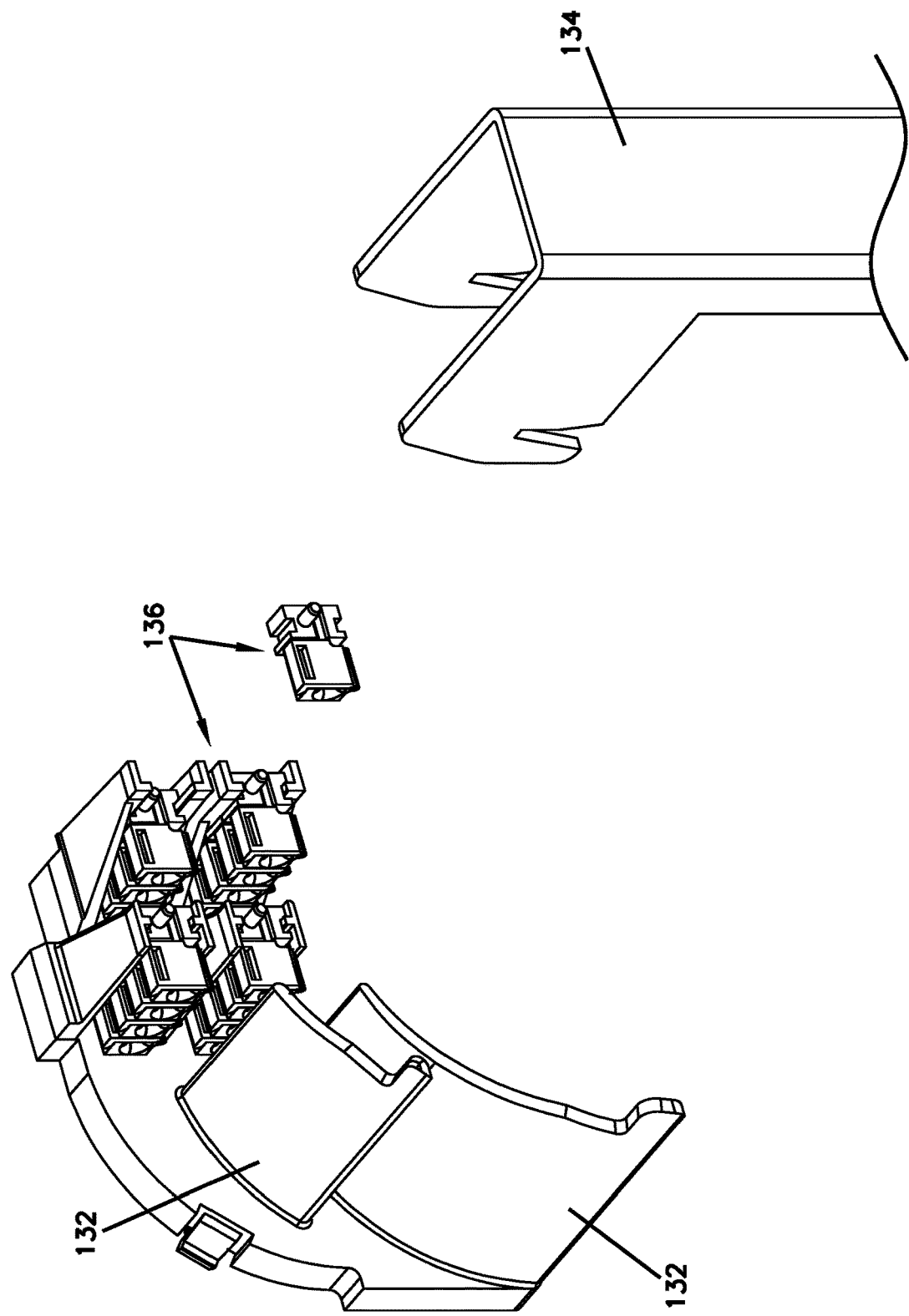
FIG. 37 is a perspective view of a subassembly of the cable management structure of FIG. 36.

FIGS. 36 and 37 illustrate enlarged views of the cable management structure located between the splice area 54 and the spools 28. Multi-piece cable holders 136 are adjacent to the splice trays 96 and feed into individual radius limiters 132. The channel cable holder 134 covers the holders 136 vertically and helps prevent optical fibers from falling out of the holders 136 and limiters 132. Many variations are possible.

Figure 38:
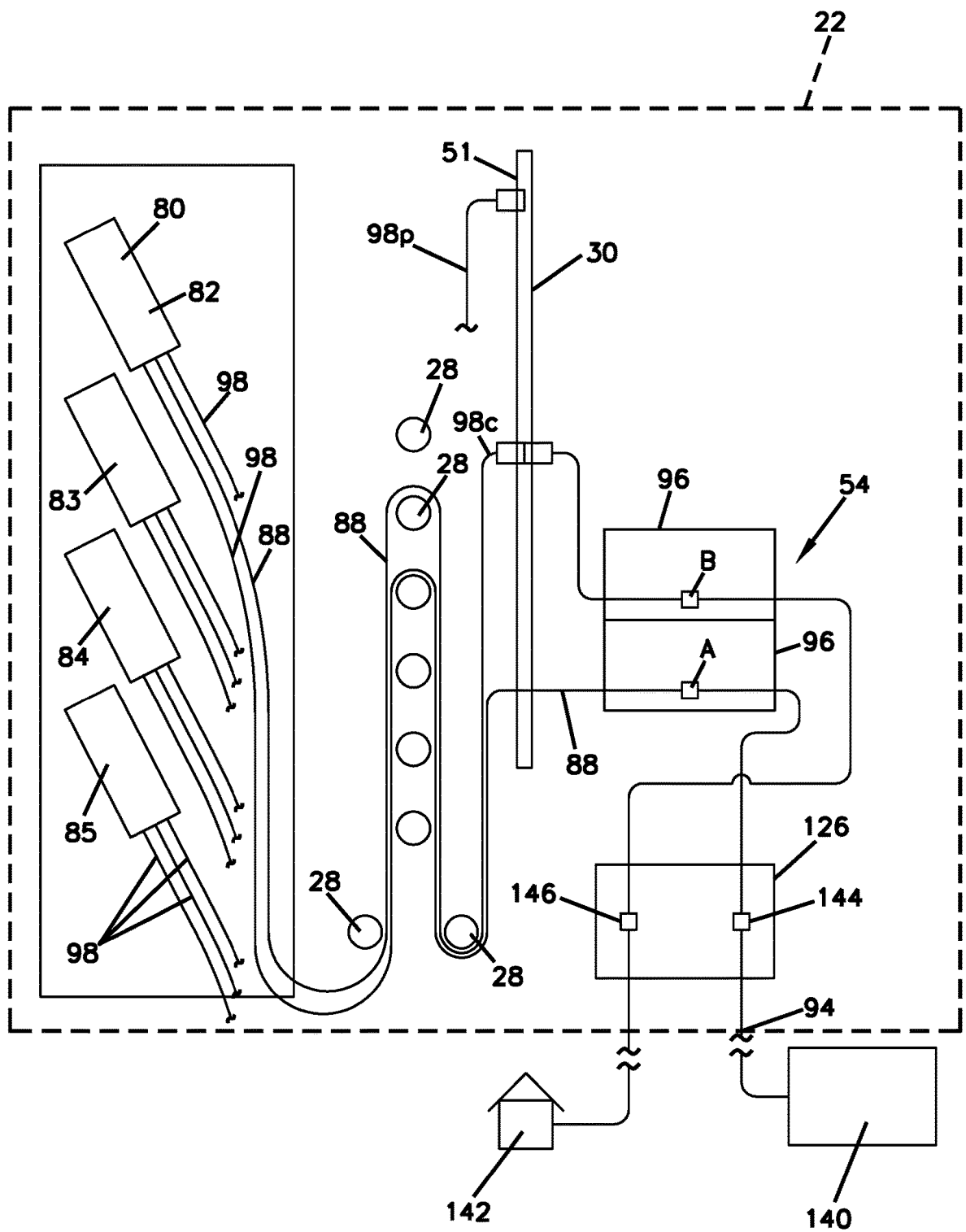
FIG. 38 is a schematic illustration showing example cable routing through the system of FIG. 28.

An example of how fiber optic cable is routed through the system 20 is shown schematically in FIG. 38. The optical fiber 88 with the signal from the cable provider (central office) 140 enters the cabinet 22 through port 94. From there, the optical fiber 88 is routed to the clamp area 126 wherein it is clamped or held with a clamp 144. From there, it is routed to splice area 54 and is spliced at A at one of the splice trays 96. From there, the spliced fiber 88 is routed to one of the splitter modules 80. In this example it is routed to splitter module 80 in the first group 82 of modules 80. The fiber 88 may also be held by one of the spools 28. From the splitter module 80, a plurality of further optical fibers, which may be in the form of pigtails 98, will extend from the splitter module 80 and then will be routed toward the patch panel 30. Any overlength in the pigtails 98 can be routed onto one or more of the spools 28. In FIG. 38, many of the pigtails 98 are shown broken away after the splitter modules 80 for purposes of illustration. It should be understood that one or more of the pigtails 98c would then be connected to the patch panel 30. In addition, one or more of the pigtails 98p may be placed into the parking area 51 (FIG. 31). From the patch panel 30, there can be a connection at one of the splice trays 96, spliced at B, and from the splice tray 96, clamped at 146 and then routed to a user 142.

The embodiment of FIGS. 28-38 has advantages in that the footprint is smaller than many traditional arrangements having similar equipment. Many variations can be made.

The above description includes example principles. Many embodiments can be made using these principles.

What is claimed is:

1. A telecommunications system comprising:
   (a) a cabinet including a framework for mounting telecommunications equipment;
   (b) telecommunications equipment mounted to the framework;
   (c) a plurality of spools mounted within the cabinet to manage overlength slack in fiber optic cables within the cabinet;
   (d) a patch panel mounted within the cabinet and defining a plurality of cable termination locations for receiving at least some of the fiber optic cables; the patch panel being mounted on a frame pivotable between a storage position and an access position; the plurality of spools positioned intermediate to the telecommunications equipment and the patch panel; and
   (e) a splice area mounted within the cabinet and accessible when the pivotable frame is in the access position; the splice area receiving fiber optic cables from the patch panel for splicing to additional cables, wherein the splice area is mounted on a wall covered by the pivotable frame when the pivotable frame is in the storage position.

2. The system of claim 1 further comprising a parking area adjacent to the patch panel for holding at least some fiber optic cables that are not connected into the cable termination locations of the patch panel.

3. The system of claim 1 further comprising a plurality of cable radius limiters on the pivotable frame.

4. The system of claim 1 wherein the telecommunications equipment is arranged in a vertical column.

5. The system of claim 4 wherein the spools are arranged in a vertical column adjacent to the column of telecommunications equipment.

6. The system of claim 5 wherein the pivotable frame is adjacent the column of spools, with the column of spools being between the column of telecommunications equipment and the pivotable frame.

7. The system of claim 1 wherein the telecommunications equipment includes at least one splitter module.

8. The system of claim 1 wherein the telecommunications equipment comprises a plurality of splitter modules.

9. The system of claim 8 wherein the plurality of splitter modules includes at least two groups of splitter modules; each group having more than one splitter module; the at least two groups arranged vertically relative to each other and with a base portion of each group being angled toward the plurality of spools relative to an upper portion of each group.

10. The system of claim 9 wherein the at least two groups of splitter modules comprise at least four groups of splitter modules.

11. The system of claim 9 wherein each group has at least four splitter modules.

12. A method of organizing fiber optic cable; the method comprising:
   (a) providing a cabinet including a framework for mounting telecommunications equipment;
   (b) mounting telecommunications equipment to the framework;
   (c) routing overlength slack in fiber optic cables in the cabinet to a plurality of spools mounted within the cabinet;
   (d) connecting at least some of the fiber optic cables into a patch panel mounted within the cabinet; the patch panel being mounted on a frame pivotable between a storage position and an access position; the plurality of spools positioned intermediate to the telecommunications equipment and the patch panel;
   (e) pivoting the pivotable frame to the access position; and
   (f) routing fiber optic cables from the patch panel to a splice area mounted on a wall within the cabinet, the wall being covered by the pivotable frame when the pivotable frame is in the storage position and being accessible when the pivotable frame is in the access position.

13. The method of claim 12 wherein the step of mounting telecommunications equipment to the framework includes mounting at least one splitter module to the framework.

14. The method of claim 13 wherein the step of mounting at least one splitter module to the framework includes mounting a plurality of splitter modules to the framework.

15. The method of claim 13 further including:
   (a) routing a fiber to a splice tray in the splice area to provide a spliced fiber;
   (b) routing the spliced fiber from the splice tray to one of the splitter modules to provide a plurality of pigtails;
   (c) routing overlength slack in the pigtails to the spools; and
   (d) connecting at least some of the pigtails to the patch panel.

16. The method of claim 15 further comprising, after the step of routing overlength slack in the pigtails to the spools, connecting at least some of the pigtails to a parking area adjacent to the patch panel.

17. A telecommunications system comprising:
(a) a cabinet including a framework for mounting telecommunications equipment;
(b) telecommunications equipment mounted to the framework;
(c) a plurality of spools mounted within the cabinet to manage overlength slack in fiber optic cables within the cabinet;
(d) a patch panel mounted within the cabinet and defining a plurality of cable termination locations for receiving at least some of the fiber optic cables; the patch panel being mounted on a frame pivotable between a storage position and an access position, the pivotable frame including a pivot section and a holding section, the pivot section being hingedly connected to the framework, the holding section being angled at a non-zero angle relative to the pivot section, wherein the holding section has first and second opposite sides, the first side holding the patch panel, the plurality of spools positioned intermediate to the telecommunications equipment and the patch panel;
(e) a splice area mounted within the cabinet and accessible when the pivotable frame is in the access position, wherein the second side of the holding section of the pivotable frame holds the splice area; the splice area receiving fiber optic cables from the patch panel for splicing to additional cables; and
(f) a plurality of cable radius limiters on the pivotable frame, the plurality of cable radius limiters being positioned along an edge of the holding section between the first side and second side.

18. A telecommunications system comprising:
(a) a cabinet including a framework for mounting telecommunications equipment;
(b) telecommunications equipment mounted to the framework and arranged in a vertical column;
(c) a plurality of spools mounted within the cabinet to manage overlength slack in fiber optic cables within the cabinet, the spools being arranged in a vertical column adjacent to the column of telecommunications equipment;
(d) a patch panel mounted within the cabinet and defining a plurality of cable termination locations for receiving at least some of the fiber optic cables; the patch panel being mounted on a frame pivotable between a storage position and an access position; the plurality of spools positioned intermediate to the telecommunications equipment and the patch panel; and
(e) a splice area mounted within the cabinet and accessible when the pivotable frame is in the access position; the splice area receiving fiber optic cables from the patch panel for splicing to additional cables.

19. A telecommunications system comprising:
(a) a cabinet including a framework for mounting telecommunications equipment;
(b) telecommunications equipment mounted to the framework, the telecommunications equipment including a plurality of splitter modules including at least two groups of splitter modules, each group having more than one splitter module, the at least two groups arranged vertically relative to each other and with a base portion of each group being angled toward the plurality of spools relative to an upper portion of each group;
(c) a plurality of spools mounted within the cabinet to manage overlength slack in fiber optic cables within the cabinet;
(d) a patch panel mounted within the cabinet and defining a plurality of cable termination locations for receiving at least some of the fiber optic cables; the patch panel being mounted on a frame pivotable between a storage position and an access position; the plurality of spools positioned intermediate to the telecommunications equipment and the patch panel; and
(e) a splice area mounted within the cabinet and accessible when the pivotable frame is in the access position; the splice area receiving fiber optic cables from the patch panel for splicing to additional cables.

\* \* \* \* \*